(12) United States Patent
Tsantilas et al.

(10) Patent No.: US 12,105,761 B2
(45) Date of Patent: Oct. 1, 2024

(54) SYSTEM AND METHOD FOR WEB CRAWLING AND CONTENT SUMMARIZATION

(71) Applicant: Panagiotis Tsantilas, Korinthias (GR)

(72) Inventors: Panagiotis Tsantilas, Korinthias (GR); Iraklis Varlamis, Athens (GR)

(73) Assignee: PALO PSIFIAKES TECHNOLOGIE EPE, Athina (GR)

( * ) Notice: Subject to any disclaimer, the term of this patent is extended or adjusted under 35 U.S.C. 154(b) by 28 days.

(21) Appl. No.: 17/984,269

(22) Filed: Nov. 10, 2022

(65) Prior Publication Data

US 2024/0160674 A1    May 16, 2024

(51) Int. Cl.
G06F 16/00 (2019.01)
G06F 16/951 (2019.01)
G06F 16/955 (2019.01)

(52) U.S. Cl.
CPC ........ G06F 16/951 (2019.01); G06F 16/9558 (2019.01); G06F 16/9566 (2019.01)

(58) Field of Classification Search
None
See application file for complete search history.

(56) References Cited

U.S. PATENT DOCUMENTS

| | | | | |
|---|---|---|---|---|
| 7,454,430 B1 * | 11/2008 | Komissarchik | ....... | G06F 16/345 |
| 7,756,807 B1 * | 7/2010 | Komissarchik | ....... | G06F 16/345 707/999.1 |
| 8,244,661 B1 * | 8/2012 | Komissarchik | ....... | G06F 16/345 706/46 |
| 8,423,495 B1 * | 4/2013 | Komissarchik | ....... | G06F 16/345 706/46 |
| 8,578,274 B2 * | 11/2013 | Druzgalski | ............ | G06F 16/29 715/239 |
| 8,620,848 B1 * | 12/2013 | Komissarchik | ....... | G06F 16/345 706/46 |
| 8,682,674 B1 * | 3/2014 | Komissarchik | ....... | G06F 16/345 704/243 |
| 8,712,992 B2 * | 4/2014 | Maykov | ............... | G06F 16/951 707/711 |
| 2007/0143263 A1 * | 6/2007 | Agrawal | ............... | G06F 16/951 |
| 2007/0214097 A1 * | 9/2007 | Parsons | .................. | G06Q 10/00 706/12 |
| 2007/0214108 A1 * | 9/2007 | Liu | ....................... | G06F 16/951 |
| 2008/0010142 A1 * | 1/2008 | O'Brien | ................. | G06Q 30/02 707/E17.108 |
| 2009/0119173 A1 * | 5/2009 | Parsons | .................. | G06Q 30/02 705/1.1 |

(Continued)

*Primary Examiner* — Farhan M Syed
(74) *Attorney, Agent, or Firm* — DP IP GROUP; Franco S. De Ligouri

(57) ABSTRACT

A web crawling solution is presented for automatically prioritizing web crawling according to crawling policies. Web page wrappers are automatically created and updated using XPath expressions and web page analysis algorithms. Crawling is implemented using parallel queues converging into a single prioritized queue taking into account web site reputation and influence and also exploiting content, comments and metadata from social media, blogs and other sources. The crawled news content is clustered according to similarity and thematic summaries are created before serving the results.

18 Claims, 13 Drawing Sheets

(56) References Cited

U.S. PATENT DOCUMENTS

| | | | |
|---|---|---|---|
| 2009/0150327 A1* | 6/2009 | Liu | G06F 16/9558 |
| | | | 707/999.005 |
| 2009/0319518 A1* | 12/2009 | Koudas | G06F 16/338 |
| | | | 707/999.005 |
| 2009/0327338 A1* | 12/2009 | Zhao | G06F 16/9558 |
| 2010/0083124 A1* | 4/2010 | Druzgalski | G06F 16/9537 |
| | | | 715/738 |
| 2011/0125726 A1* | 5/2011 | Neagovici-Negoescu | |
| | | | G06F 16/901 |
| | | | 707/E17.108 |
| 2011/0218993 A1* | 9/2011 | Van Mulligen | G06F 16/951 |
| | | | 707/E17.014 |
| 2012/0131139 A1* | 5/2012 | Siripurapu | H04L 65/60 |
| | | | 709/217 |
| 2012/0232885 A1* | 9/2012 | Barbosa | G06F 40/40 |
| | | | 704/E15.001 |
| 2014/0006408 A1* | 1/2014 | Rae | G06F 40/295 |
| | | | 707/E17.089 |
| 2015/0066895 A1* | 3/2015 | Komissarchik | G06V 30/413 |
| | | | 707/709 |
| 2015/0128272 A1* | 5/2015 | Chen | H04L 63/1483 |
| | | | 726/23 |
| 2017/0185678 A1* | 6/2017 | Zou | G06F 16/9566 |
| 2018/0032626 A1* | 2/2018 | Ben-Aharon | G06F 16/25 |
| 2018/0239825 A1* | 8/2018 | Tripathi | G06F 16/9558 |
| 2021/0157858 A1* | 5/2021 | Stevens | G06F 40/279 |
| 2021/0342548 A1* | 11/2021 | Galitsky | G06F 40/35 |
| 2022/0245574 A1* | 8/2022 | Cella | G06Q 10/087 |
| 2022/0293107 A1* | 9/2022 | Leaman | G06F 16/951 |
| 2023/0078448 A1* | 3/2023 | Cella | G06Q 10/06311 |
| | | | 705/7.13 |
| 2023/0123322 A1* | 4/2023 | Cella | G06Q 30/0202 |
| | | | 700/29 |
| 2023/0206329 A1* | 6/2023 | Cella | G06Q 20/405 |
| 2023/0214925 A1* | 7/2023 | Cella | G06Q 30/06 |
| | | | 705/37 |
| 2023/0419277 A1* | 12/2023 | Cella | G06F 16/9035 |

* cited by examiner

SYSTEM AND METHOD FOR WEB CRAWLING AND CONTENT SUMMARIZATION

BACKGROUND

Field

The present disclosure relates to Internet, news and social media channel crawling based on web source reputation and classification, and content summarization.

Background Information

Web crawling is a mechanism widely used to search for content in web sites and web pages across the Internet. It is widely used by search engines for paging the Internet to facilitate subsequent searches or is used specifically for collecting content related to some parameter, like a news theme.

Typically web crawling uses crawling policies that define what, where and how to search and retrieve web content and often involves prioritization of accessing web content sources so as to better use scarce and finite crawling resources.

The creation and maintenance of a large-scale web crawler and content aggregator is a tedious task that requires continuous updating and adaptation. Typically, many web content sources do not use automatic feeds of information and the structure of the web page varies significantly across web sites and changes from time to time. All these aspects put web crawling in need to continuously create and modify web page wrappers used to crawl web pages. Such a process is done either manually or semi-automatically, requiring significant manual input and supervision on a regular basis.

Furthermore, the creation of crawling policies is typically done based on web site frequency of visit, therefore, ignoring other important qualitative features related to the actual content of the web site.

Similarly, web content needs to be summarized for better presentation and readability. Current approaches are manual or semi-automatic, with the inherent human intervention costs and delays when handling huge amounts of data.

It is, therefore, needed a crawling mechanism that can automatically create and continuously adapt crawling policies and web page wrappers with the aim to automatically crawl and thematically summarize large volumes of web news content from a variety of sources.

SUMMARY

The present innovative web crawling solution tackles the problem of automatically prioritizing web crawling and generating news summaries for news topics. The present solution crawls news articles from a variety of news sites each having different structure and content type and incorporates news items, comments, etc. from social media, blogs and other sources that do not have automatic content distribution mechanisms.

The present solution uses automatically generated web page wrappers to crawl, analyze and extract web pages based on their structure and content using XPath expressions, and a variety of techniques including neural networks, and natural language processing and understanding. The web page wrappers are evaluated for their efficiency in crawling and are automatically updated every time the structure of the web pages they are associated with changes.

Web crawling policies are also continuously updated to reflect, among other things, the reputation and impact of a web page and to prioritize the most influential updated news sites per thematic subject. The innovative solution considers the number of references by other sources (including news sites and social media) to the articles published by a first web site (e.g., news site) and the number of articles (at the first or other web sites) that discuss the same event/topic/entity after it is first discussed by the articles of the first web site.

The crawling is implemented using multiple parallel queues for news items to be fetched and multiple threads that consume the queues. The parallel queues finally converge to a single prioritized queue that is used to crawl web sites according to the crawling policies.

Once the content is crawled it is analyzed with any of a variety of techniques, including natural language understanding, clustered according to similarity and summaries per news theme are created by either selecting appropriate sentences from the clustered news articles or using natural language synthesis techniques.

DETAILED DESCRIPTION

Figure 1:
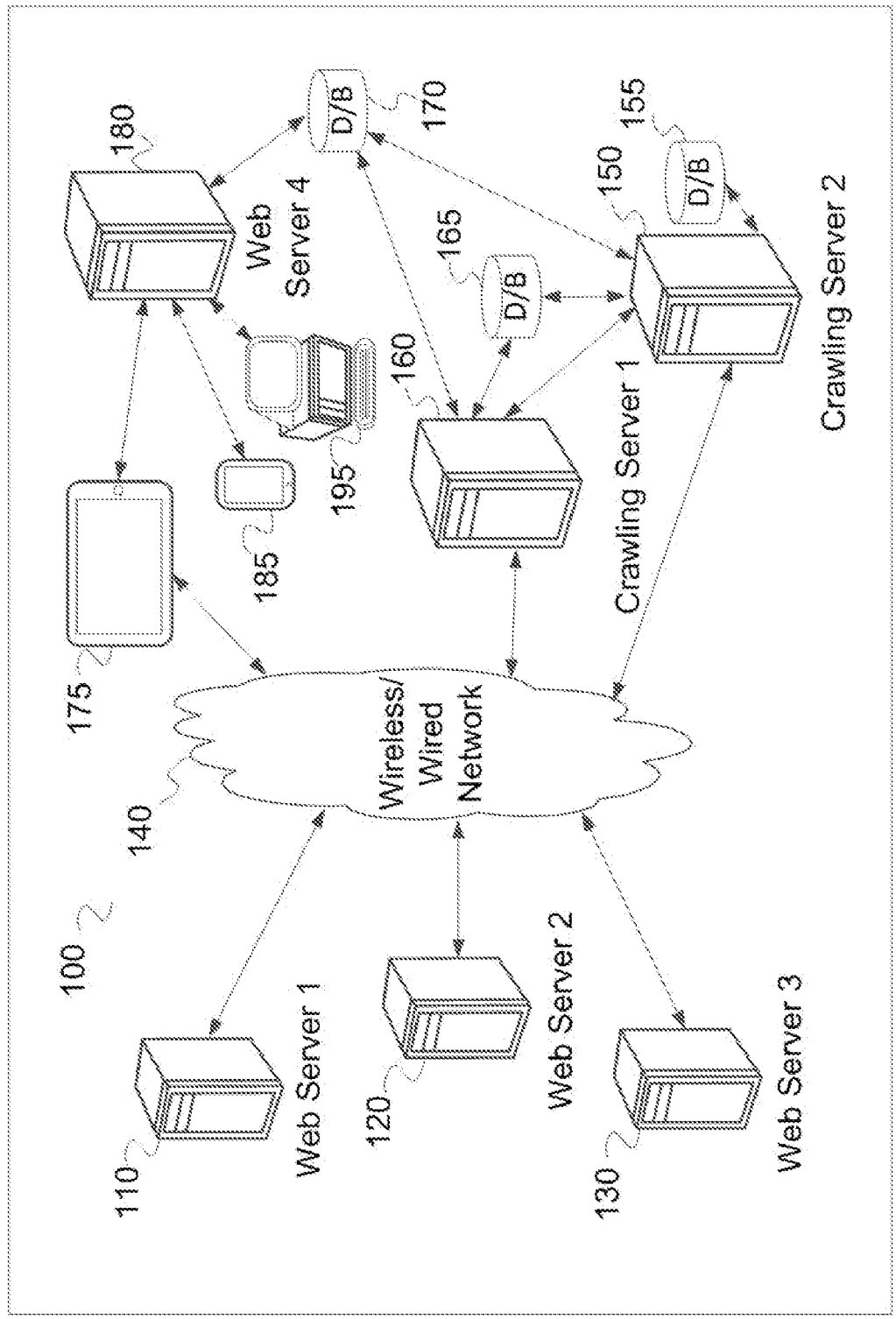
FIG. 1 shows a schematic diagram of an exemplary embodiment of the proposed innovative crawling system.

The word "exemplary" is used herein to mean "serving as an example, instance, or illustration". Any example described herein as "exemplary" is not necessarily to be construed as preferred or advantageous over other embodiments.

The acronym "ASIC" is intended to mean "Application Specific Integrated Circuit".

The acronym "BoW" is intended to mean "Bag-of-Words".

The acronym "CAN" is intended to mean "Controller Area Network".

The acronym "CNN" is intended to mean "Convolutional Neural Networks".

The acronym "CPU" is intended to mean "Central Processing Unit".

The acronym "DNS" is intended to mean "Domain Name Server".

The acronym "IoT" is intended to mean "Internet of Things".

The acronym "NER" is intended to mean "Named Entity Recognition".

The acronym "NLA" is intended to mean "Natural Language Analysis".

The acronym "NLP" is intended to mean "Natural Language Processing".

The acronym "NLS" is intended to mean "Natural Language Synthesis".

The acronym "NLU" is intended to mean "Natural Language Understanding".

The acronym "OS" is intended to mean "Operating System".

The acronym "RNN" is intended to mean "Recurrent Neural Networks".

The acronym "RSS" is intended to mean "Rich Site Summary" and "Really Simple Syndication".

The acronym "SVM" is intended to mean "Support Vector Machine".

The acronym "UPS" is intended to mean "Universal Power Supply".

The acronym "W3C" is intended to mean "World Wide Web Consortium".

The acronym "XML" is intended to mean "eXternsible Markup Language".

The acronym "Xpath" is intended to mean "XML Path Language".

The acronym "UPS" is intended to mean "Uninterruptible Power Supply".

The acronym "URL" is intended to mean "Universal Resource Locator".

The acronym "USB" is intended to mean "Universal Serial Bus".

As used herein and in the appended claims, the singular forms "a," "and," and "the" include plural referents unless the context clearly dictates otherwise.

Unless defined otherwise, all technical and scientific terms used herein have the same meaning as commonly understood by one of ordinary skill in the art to which this invention belongs (web crawlers, Internet, computers, data processing). Although any techniques similar or equivalent to those described herein can be used in the practice or testing of the invention, the preferred techniques are described.

The present innovative web crawling solution focuses on crawling for news and social media content, which is not available to fetch through RSS feeds or other structured and automated mechanisms.

The present innovative solution implements a source prioritization mechanism for all content sources, which mechanism takes into account the source influence, reputation and impact and prioritizes the most influential updated news sites per thematic subject. The innovative solution considers the number of references by other sources (including news sites and social media) to the articles published by a first web site (e.g. news site) and the number of articles (at the first or other web sites) that discuss the same event/topic/entity, after it is first discussed by the articles of the first web site. The present crawling solution uses multiple parallel queues, for items to be fetched, and multiple threads that consume the queues. These threads and queues are implemented either in software, hardware, or a combination thereof and are either local to a computing device (e.g., a server where the present crawling solution is executed) or distributed across more than one computing devices. In alternative exemplary embodiments, the computing devices may be chosen among servers, desktop computers, laptops, tablets, smartphones and the like.

Since the resources of a crawling engine are not unlimited, configuring a crawling solution to collect content across web sites typically involves prioritizing what to crawl, when and how many resources to allocate to each content source (whether a web site with a collection of similar web pages, or single web page at a web site).

Typically prioritizing webpage crawling tasks involves using the popularity of the web content and web sources to be crawled. However, it is also important to allocate resources not only to web sources that frequently update their content (as typically web crawlers do) but also to influential web sources (e.g., web sources that are widely accepted as reputed sources, are preferentially viewed, etc.). Taking into account the influence of content sources can help increase the efficiency of the crawling process and the impact of the crawled content, which may then be processed to create aggregated content that is served to end users.

In addition, the present innovative solution automates the content collection process from web sources that do not use RSS or other structured and/or automated techniques for content collection. For each specific web source, the present innovative solution employs a combination of machine learning and rule-based techniques for identifying text segments of special interest (e.g., article title, body, links to articles, links to article categories) and automatically defining crawling policies for each source of web content. The crawling policies (page wrappers, crawling priorities, etc.), which differ across web sources are automatically generated the first time a source is crawled and are updated when the structure of a source changes (e.g., when the structure, elements and their order in a web page or site is modified).

In the absence of a common syndicate method (such as RSS) to access this content, existing news crawlers are either limited to sources that provide RSS feeds, or manually create and maintain different crawling policies (wrappers, priorities, etc.) for each web source. Different crawling policies are needed, since each news source uses its own template to serve content. The burden both for the manual creation and also for the maintenance of the crawling policies is large and this restricts companies offering web crawling and web content processing and aggregation services from aggregating hundreds or thousands of sources. Despite the progresses on automatic wrapper maintenance that are found in the literature, the initial wrapper creation still remains a manual task.

There is, therefore, a need for an automatic solution to create and continuously update web crawling policies. Such a method should automatically adapt to changes in the structure of web content sources, their impact and priorities.

The present innovative solution provides an elegant solution to the above problem, by teaching a novel page wrapper creation and maintenance mechanism, coupled with a novel crawling priority mechanism based on web content source impact and reputation and implemented with a number or parallel queues that are consumed to form a final queue used for continuous web crawling. Content collected by the crawling process is continuously aggregated by an innovative content clustering/summarization method, which clusters together similar articles (that discuss the same event, topic or entity), identifies the main sub-topics discussed by the articles of the cluster, and generates sentences that describe each sub-topic. A clustering/summarization module can create new content from multiple mentions of an event in traditional web media. The clustering/summarization module combines an extractive and an abstractive summarization step, where the former step selects the topics of a cluster and the most representative groups of sentences for each topic and the latter step composes new lexical chains that cover each topic in the cluster. Although the extractive summarization step has been extensively studied by researchers and commercial systems, the abstractive step takes advantage of the repetitive content in the news cluster to create more comprehensive summaries than the existing seq2seq models.

In the case of hundreds or thousands of web sources, content overlap is huge and the clustering mechanism is important for the presentation of the news content. Users interested in an event, get a quick idea from the automatically generated summary and can then browse the articles grouped in the same cluster at their own time. This automatic summarization process improves the reading experience and allows new content delivery services to be deployed, e.g., news services that provide a summary of the news and which summary is continuously updated taking into account not simply the visit rate or web sources but also the impact, influence and other parameters of the web sources and includes social media content, data and metadata relating to the original web content.

Crawling System Architecture

FIG. 1 shows a schematic diagram of an exemplary embodiment of the proposed innovative crawling system. Crawling system 100 comprises at least one crawling server in communication with at least one web server and optionally with at least one computing device. In the illustrated exemplary embodiment of FIG. 1, a first crawling server 160 is connected with a database 165. Database 165 is implemented either internally at crawling server 160 or externally, e.g., as a networked database server or other configuration obvious to a reader of ordinary skill in related art. Database 165 comprises various types of data, such as crawling policies, crawling results, crawling queues, etc. These data may be stored in encrypted, unencrypted, compressed, descriptive (e.g., a type of XML or other descriptive language may be used) or a combination thereof.

Crawling server 160 accesses the first database 165 for reading and writing crawling policies and data during the crawling processes and serving the results to stakeholders. Crawling server 160 is also connected to a second database 170, which database may hold additional crawling policies and/or results and is configured similarly to first database 165, and to an optional second crawling server 150. Crawling server 150 is also connected to first database 165, to second database 170, and (in an alternative exemplary embodiment) to a third database 155, which third database 155 is configured similarly to first database 165 and contains additional crawling policies and/or results.

The first 160 and second 150 crawling servers are configured to work in parallel and speed up the crawling process. In one aspect, first crawling server 160 acts as a master, running software that manages the parallelization of the crawling process and of the workload and results of the two crawling servers. In another aspect, second crawling server 150 is the master, while in yet another aspect, switching master status during the crawling operation is done as a result of changing operational conditions (e.g., server processor performance declining as a result of overheating, diminishing network throughput, etc.).

In an alternative exemplary embodiment, additional databases and crawling servers may be added, or in cases where massive parallelization is needed, crawling server farms may be used either locally or cloud based. In yet another exemplary embodiment only first crawling server 160 and first database 165 are used and all processing and storage needed for web crawling is implemented in these two elements of system 100.

The first and second crawling servers 160, 150 communicate via any available type of wired or wireless network 140 (cloud infrastructures being an example of such a network) with a first web server 110, which web server hosts at least one web site or web portal consisting of at least one web page. In practice first web server 110 hosts dozens of web sites or portals, each consisting of dozens or hundreds of web pages stored in databases or file systems local or remote to the first web server 110.

In another aspect, the first 160 and second 150 crawling servers are also connected to a second web server 120 and a third web server 130 configured similarly to the first web server 110. In alternative exemplary embodiments, additional web servers exist which may be configured as a web server farm or otherwise.

Crawling results are stored by the first 160 and second 150 crawling servers at local storage (in the crawling servers) or at databases 165, 170, 155. These results can be accessed directly from crawling servers 160, 150, or more often from a computing apparatus (e.g. a desktop computer 195, a server (not shown), a laptop (not shown), a tablet 175, a smartphone 185, or other electronic device (not shown) with sufficient computing power like an Internet of Things (IoT) networked device, etc.). Such computing apparatuses access crawling results via a fourth web server 180, which server connects to database 170, which database is connected via servers 160, 170 to databases 165, 155. In an alternative exemplary embodiment, the previous computing apparatuses access crawling results via any of the first 110, second 120, or third 130 web servers.

Alternative exemplary implementations of crawling system 100 may be used, where certain elements are omitted or merged, and others are introduced. As a basic configuration, one may consider a single crawling server, a network infrastructure and a web server. The various configurations of system 100 may also include cloud-based components while the components illustrated in FIG. 1 may be physical or virtual.

Hardware Architecture

Figure 2A:
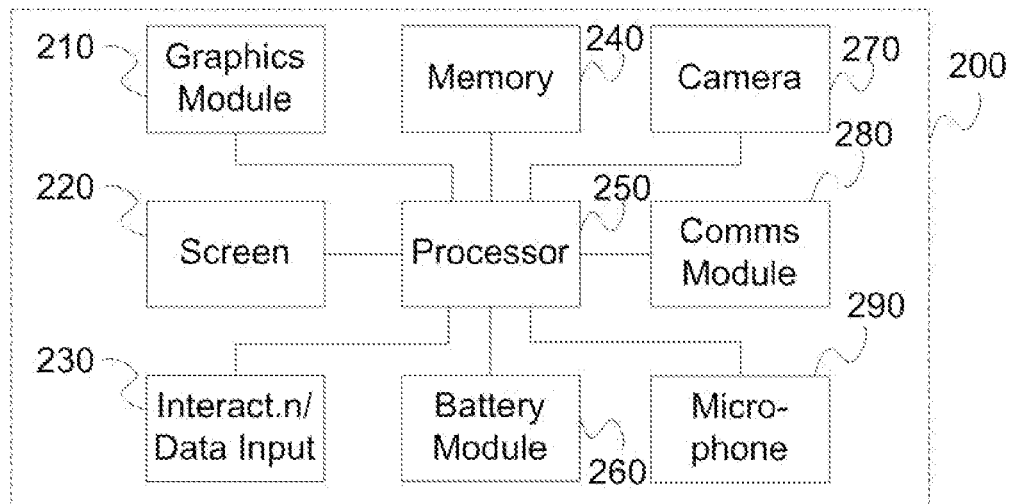
FIG. 2A shows a hardware architecture block diagram for the servers and computing apparatus modules of crawling system 100.

FIG. 2A shows a hardware architecture block diagram for the servers and computing apparatus modules of crawling system 100. Hardware module 200 comprises a series of modules 210-290. These modules may be substituted for other similar modules, while some or all of these modules may be duplicated for ensuring uninterrupted operation in the event of failure of a module or for increasing a module's capacity and capabilities as in the case of memory module

240. Modules 210-290 are connected to each other via a data bus and a control bus where one module with suitable logic acts as a master module.

In alternative exemplary embodiments, some or all modules 210-290 are equipped with microprocessors or microcontrollers and any of them may become a master communicating with other modules via a multi-master bus, e.g., a Controller Area Network (CAN) bus.

Hardware module 200 comprises a central controller or processor 250, which contains logic and/or software to integrate data from other modules and make operational decisions, one or more memory modules 240 (these may be implemented as volatile or permanent memory, hard disk, or other type of data storage type) for storing the data to be handled by processor 250 or exchanged between module 200 and other modules of system 100, communications module 280 for communicating with other system 100 modules, and battery modules 260 for powering up module 200 (may be implemented in the form a simple rechargeable battery, a smart battery, a Universal Power Supply (UPS) module, or other similar technology). According to the type of hardware module 200, additional modules may be included, like graphics module 210 for creating graphical content to display to module's 200 user, screen 220 to display the graphics from module 210, interaction/data input module 230 for allowing the user to interact, microphone 290 to capture user's voice commands or ambient sound, and camera 270 to capture visual content like screenshots, page scans, user gesture for interaction, etc.

The modules of system 200 may be reduced, merged, or new modules added according to the type of system's 100 module implementation, e.g., a camera and microphone are included in a smartphone but not in a web server or crawling server.

In alternative exemplary embodiment of module 200, modules 210-270 and 290 are connected to the communications module 280, where the communications module is responsible for managing in module 200 communication between modules 210-270 and 290, handling the control and data buses, and performing out-of-module 200 communication tasks with other modules of system 100.

Each module 200 may take the form of an off-the-shelf computing apparatus (server, desktop computer or computing device), or an embedded system, that is a system based on microcontrollers (i.e., Central Processing Units (CPU) with integrated memory or peripheral interfaces). In implementations of the embedded system modules, the processor(s) used are of types ranging from general purpose processors to processors specialized in certain classes of computations, or even custom processors designed for the application at hand. In one aspect, specialized processor chips and systems are embedded Application Specific Integrated Circuit (ASIC) chips or systems. Both design solutions, i.e. general-purpose and ASIC microcontroller systems run embedded software, and each module may have its own system clock, communication capabilities with the bus, bus controller, etc. Such a design allows simple plug-n-play of any of system's 200 modules 210-290 and the replacement of any module with a replacement module in the event of a module failure, or with a module suitable for a specific use case or client, according to local regulations, marketing related concerns and options, and service agreements, or with newer or improved versions and types of modules as they become available. Furthermore, such a system design also allows for hot (i.e., during operation) replacement or addition of system modules without interrupting system 200 operation. This is particularly important for not interrupting system logging, diagnostics, and tracking and, therefore, not jeopardizing integrity and security.

Memory module 240 can be implemented in any known storage technology comprising, but not limited to, magnetic disks, optical disks, flash memory, Random Access Memory (RAM), Read Only Memory (ROM), Erasable Programmable Read Only Memory (EPROM), or other, and can be duplicated for performance, redundancy or other considerations. In an exemplary embodiment, all storage modules are of the same type, while in an alternative exemplary embodiment a combination of storage modules of different technologies may be used. New technologies may be used in the storage modules as soon as these technologies become available.

Graphics module 210 is chosen so as to match the capabilities of screen 220, which screen may be of any type, comprising alphanumeric display, monochrome or full-color screen, touch screen, 3D screen or other display type. Similarly, interaction/data input module 230 may comprise key input, touch screen input, gesture-based input, remote device (e.g., a portable computing or interaction device) wirelessly or via wire communicated input, or other input technology.

Battery module 260 is responsible for supplying power to module 200. In an alternative exemplary embodiment, battery module 260, also supplies power to the system buses, which buses then supply power to all the remaining system 200 modules that do not have a battery module. In one aspect, battery module 260 comprises a power management unit which can regulate the supply power and perform operations like power shut-down if instructed to do so by the module's 200 processor 250. By means of example, a power shutdown may happen if the system detects hazardous operating conditions that may harm system hardware, prohibition of operation for whatever reason (e.g., unauthorized access), etc.

In alternative embodiments battery module 260 may also comprise logic to make decisions (e.g., for power shutdown) on its own in situations where processor module 250 has failed, based on data from sensor modules (not illustrated in FIG. 2A but optionally included in certain exemplary embodiments), or commands received from other computing apparatuses of system 100.

Communications module 280 enables communication of module 200 with other modules and/or systems. Communications module 280 has the form of an Input/Output (I/O) module (for wired or wireless data communication between module 200 and other modules 200 of system) or data/control bus driver/transducer (for wired data/control signal communication between modules 210-290 of module 200).

Communications modules 280 comprise hardware modules for I/O with at least one of fast wireless, wired and optical network data transfer. Wired connections are preferable to wireless connections for the significantly higher throughput of wired connections over wireless connections, though wireless data transfer could be used in alternative embodiments. By means of example, the wired link may comprise any fast wired data bus or preferably an optical link. The exact protocol of the chosen link is beyond the scope of this innovative solution and any such protocol may be used.

Processor module 250 is the main processing element of system 200 and comprises either an off-the-shelf processing chip or processor card, or a single embedded processor unit, while in alternative exemplary embodiments module 250 comprises a redundant set of embedded processor units for ensuring uninterrupted operation in the event of a processor failure. Firmware runs at central controller module 250, while in alternative multi-processor embodiments a hypervisor is used to control virtual machines running at the other processors (e.g., in parallel processing configurations with multiple processor chips/cards).

Figure 2B:
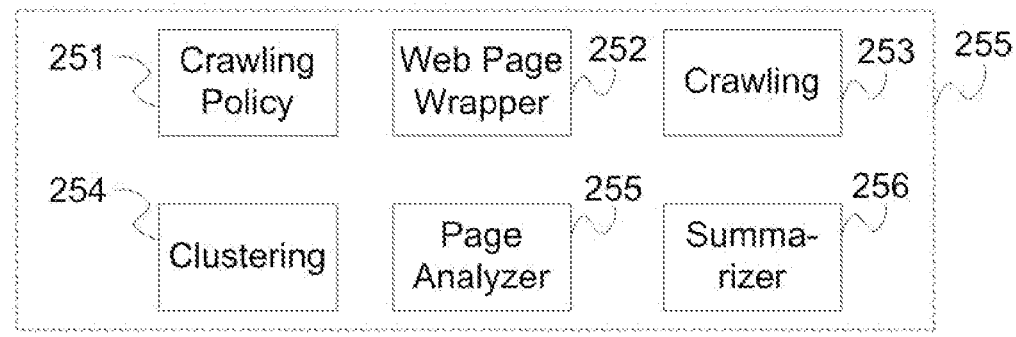
FIG. 2B shows an exemplary high-level hardware architecture of a processing module according to the present innovative solution.

FIG. 2B shows an exemplary high-level hardware architecture of a processing module according to the present innovative solution. Processor module 250 is made up of a series of processing submodules. In particular, processor module 250 has a crawling policy 251, a web page wrapper 252, a crawling 253, a clustering 254, a page analyzer 255, and a summarizer 256 submodules. In alternative exemplary implementations submodules 251-256 may be merged, duplicated (e.g., for speed or redundancy) or distributed to more than one processor modules 250 in the same computing apparatus, or across networked apparatuses (e.g. networked servers, cloud infrastructures, etc.).

In another exemplary implementations, processor module 250 is designed to include more than one processing cores. Each or some of the processing cores of processor module 250 contain all or some of submodules 251-256. As a result of such multicore designs, the present innovative solution's steps are serially executed in the processing core when each processing core contains one or more of submodules 251-256. Alternatively, when each processing core contains all submodules 251-256, the present innovative solution's steps are executed in parallel, where each submodule 251-256 produces results for e.g., a type of input web sites, etc.

Software Architecture

Figure 3:
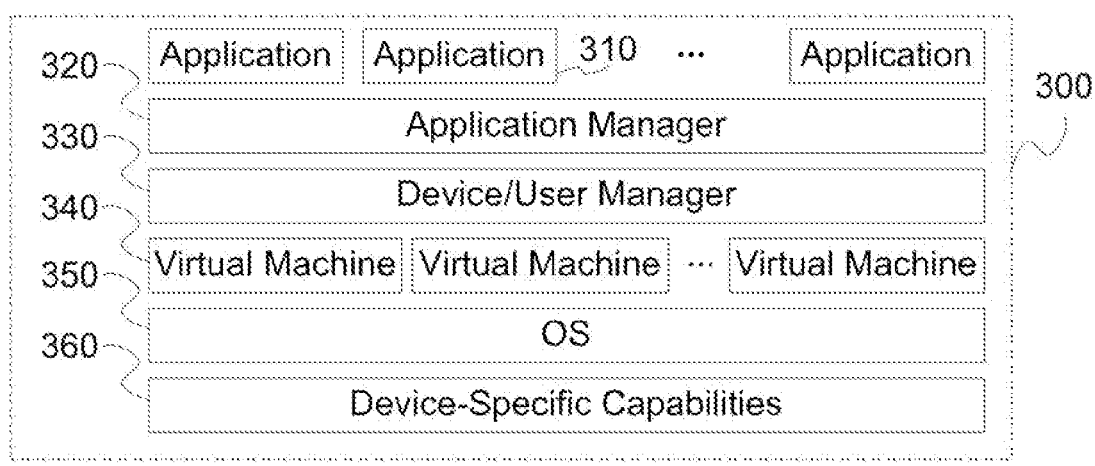
FIG. 3 shows a software architecture block diagram for a non-server computing apparatus of system 100.

FIG. 3 shows a software architecture block diagram for a non-server computing apparatus of system 100. At the lowest layer of software components 300 are the Device-Specific Capabilities 360 that is the device-specific commands for controlling the various device hardware components of module 200. Moving to higher layers lie the Operating System (OS) 350, Virtual Machines 340 (like a Java Virtual Machine), Device/User Manager 330, Application Manager 320, and at the top layer Applications 310. These applications may access, manipulate and display data. Software components 300 may be implemented in any preferred programming language (including descriptive languages of the eXternsible Markup Language (XML) type) or in a combination of two or more programming languages of the same or different level.

Figure 4:
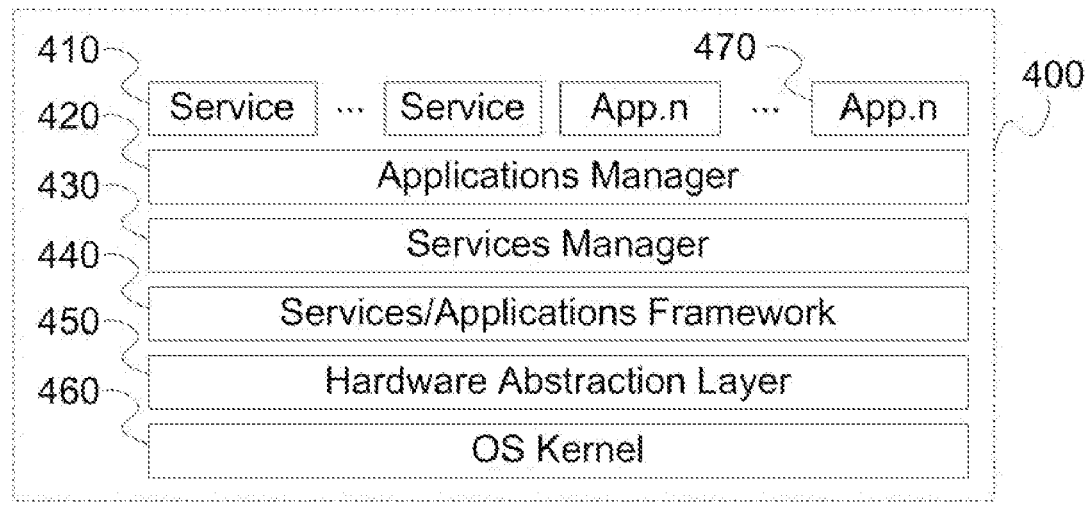
FIG. 4 shows the main software components of a server.

FIG. 4 shows the main Software Components of a Server. At the lowest layer of software components 400 is OS Kernel 460 followed by Hardware Abstraction Layer 450, Services/Applications Framework 440, Services Manager 430, Applications Manager 420, and Services 410 and Applications 470. Software components 400 may be implemented in any preferred programming language (including descriptive languages of the eXtensible Markup Language (XML) type) or in a combination of two or more programming languages of the same or different level.

It is noted, that the software and hardware components shown in FIG. 3 and FIG. 4 are by means of example and other components may be present but not shown in these Figures, or some of the displayed components may be omitted or replaced with others without departing from the scope of the present innovative solution.

The present innovative solution may also be implemented by software running at crawling server 160, or at additional crawling servers or at one or more distributed computers not shown (e.g., cloud infrastructure, remote servers, server farms, or other computing devices, etc.), or any combination thereof. The present innovative solution may be implemented in any computing language, or in an abstract language (e.g., a metadata-based description which is then interpreted by a software and/or hardware component). The software running in the above-mentioned hardware, effectively transforms a general-purpose or a special-purpose hardware or computer into one that is configured to specifically implement the present innovative solution.

In the exemplary embodiment where electronic modules 200 run embedded software to perform their tasks, a layered architecture design is used without limiting embedded software design to a specific paradigm. Other designs are used in other alternative exemplary embodiments.

Crawling and Summarization

Figure 5:
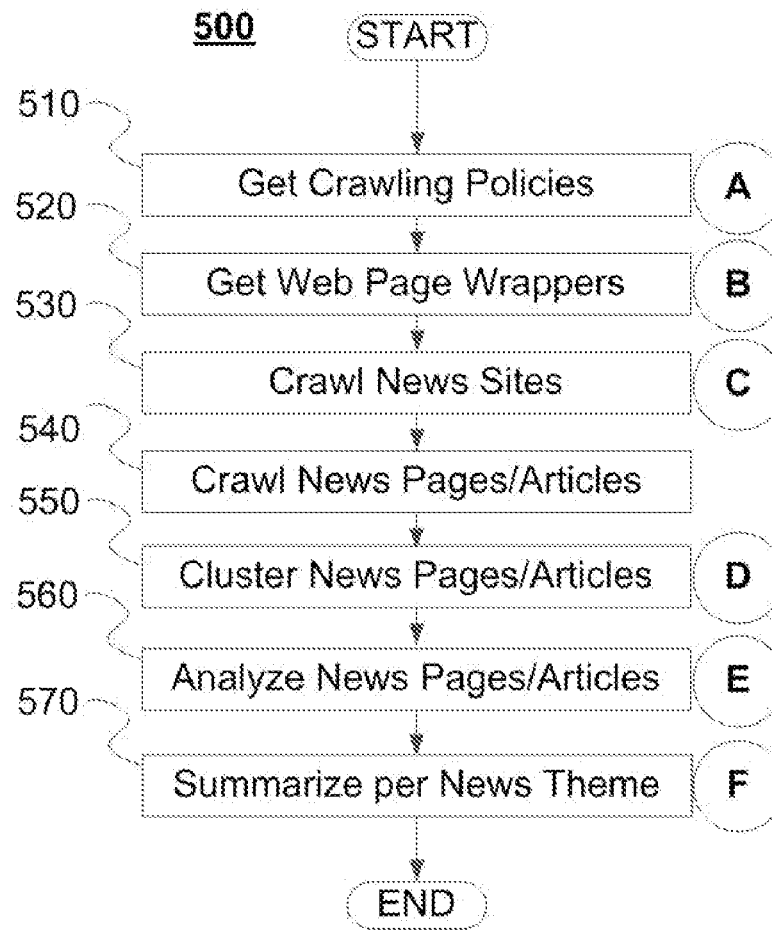
FIG. 5 is a high-level flow diagram of the crawling and summarization process.

FIG. 5 is a high-level flow diagram of the crawling and summarization process. For ease of description, FIG. 5 describes an exemplary embodiment, where a single crawling server 160 is used. It is assumed that the process can be expanded to include additional crawling servers, though not specifically analyzed in detail below.

Process 500 starts with step 510 where crawling server 160 gets the crawling policies (or in alternative exemplary embodiments creates the crawling policies) that describe what, how, and where to crawl. The crawling policies may be stored at local storage (memory, hard disk, etc.) of crawling server 160 or at databases 165, 170 or at the cloud. In alternative exemplary embodiments, crawling policies may be broken in sub-policies and distributed at more than one database, crawling servers or cloud modules. In such a case, sub-policies may be needed to synthesize the policy that will be used by crawling server 160, or where multiple crawling servers are used, one sub-policy is (or more sub-policies are) assigned to each crawling server.

After having analyzed the crawling policies, crawling server 160 proceeds in step 520, where the crawling server gets web page wrappers (or in alternative exemplary embodiments creates and/or updates the web page wrappers), which have already been created and which are stored in the same or alternative locations to the crawling policies.

Web page wrappers (may be viewed as components of a crawling policy) are descriptions of the structure and content of a web page, where items such as title, advertisements, article body, contents, links to other pages, images, etc. have been identified. The page wrappers are created by analyzing multiple pages of a website in terms of aesthetic aspects and page components' arrangement, length of text (e.g., titles are shorter than article bodies), font types and sizes, placeholders, etc. Other types of analysis are also used like Natural Language Processing (NLP) and Natural Language Analysis (NLA), machine learning etc. Page wrappers can then be used to automatically process (crawl) web pages of the same type, e.g., web pages in the same web site or web sites and pages using the same or similar layout and design, etc. As a result, clusters of similar web pages can be crawled using the same web page wrapper.

Crawling server 160 uses the fetched web page wrappers to crawl news sites 530, and news pages and articles 540. All the crawled news pages and articles are then clustered 550 and analyzed 560 to create news summaries per news theme 570.

The news sites to crawl are part of the crawling policies or in another aspect are part of other data structures.

The high-level flow diagram of FIG. 5 is analyzed in FIG. 6-13 where more detail is presented as to the implementation of steps 510-570.

Figure 6:
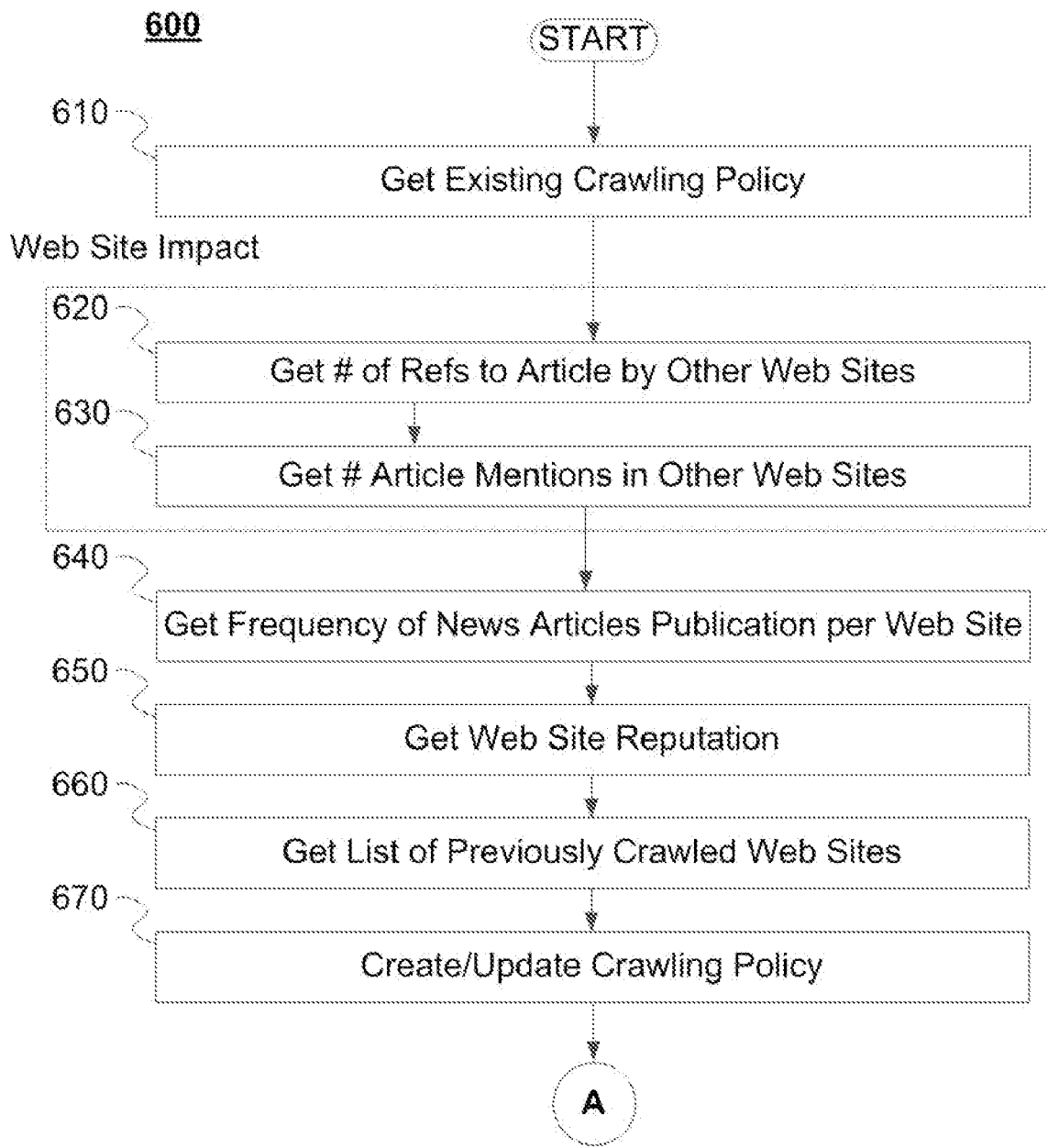
FIG. 6 is a flow diagram showing how a crawling policy is created and updated.

FIG. 6 is a flow diagram showing how a crawling policy is created and updated. Process 600 starts with an existing crawling policy being fetched 610 from its storage location, if such a policy exists.

Table 1 below shows an example crawling policy. The example crawling policy is implemented as a configuration file. The configuration file contains, in the form of key-value pairs, all the information needed by the wrapper to extract the appropriate content from a news source. The first part of the file configures the wrapper to access the homepage of the news source and extract links to articles. It also contains some general configuration for the source, such as content language and encoding, and metadata such as source name, etc. The second part of the file contains instructions that configure the wrapper to extract specific content of interest from the article pages, such as title, body, author, etc., which have the form of Xpath expressions and additional configuration on how to process the extracted content (e.g., date formats, tags to ignore, etc.).

TABLE 1

Example Crawling Policy javascript=true
rss=http://www.protothema.gr/rss/news/general/
charset=utf-8
name=ProtoThema
tagsToRemove=script,div
xpathbody=//div[@class="article-content"]
xpathsurtitle=//div[@class="article-title"]/p
xpathsubtitle=//div[@class="article-content"]/h3
xpathauthor=//div[@class="article-info"]/span[@class="name"]
jquerymidtitle=b
jquerycaption=
xpathlead=//div[@class="article-content"]/h3
xpathedition=
dateFormat=EEE, d MMM yyyy HH:mm:ss Z
bodyremoveregex=_ Fill-in your e-mail to receive all the breaking news first!
Send \\s*Follow us on__ __(\\/\\*<!).*?(>\\*\\/)
parQuery=h3__(<br>)+
toReplace={ "<h3>" : "", "</h3>" : "","<br><br>" : "</p><p>","<br/>":"</p><p>","<br />":"</p><p>" }
presstitle=PROTO THEMA Based on the crawling policy, crawling server 160 knows what (e.g. type/subject of news article), how (i.e. what to look for in the web page layout/content) and where to search (i.e. which are the web site/page URLs to crawl), and proceeds with calculating the impact of web sites to be crawled by calculating the number of references to an article in a web site by other web sites 620 and the number of mentions (or reproductions) of the article in social media and other news sites 630.

The crawling server then aggregates the frequency of article mentions per web site 640 and uses this frequency, together with additional data (publishing rate, thematic categorization of sources, history of a source reputation etc.), to estimate the web site reputation in different thematic categories 650. These additional data include previously computed news site reputation data, negative feedback on site (e.g., users negative comments), regulator's sanctions against a site for bad journalism practices, etc. For example, a site that publishes several financial news items, which are quickly reproduced by other news sites, or are rapidly discussed in the blogosphere or in social media is a highly reputable source on the financial domain, compared to others that only once published an influential news item, among the dozens of articles that they publish every day on different subjects/domains. In contrast to existing crawling techniques that prioritize news sources depending on their refresh rate and independently of the domain, the current crawler focuses on source reputation per domain and results in collecting content more frequently from authoritative sources and indirectly increasing its own authority score. Reputation of a web content source is also affected by ratings of sources as these may be created by special agencies or by readers.

A list of previously crawled web sites, if any, is fetch 660, and the web site reputation is used to create or update the crawling (prioritization) policy 670 that will be used in subsequent crawling processes. For example, the crawling policy will rank the financial news reputable source higher than other sources of lower reputation and consequently crawl this financial news source before and more often than crawling other web sites with lower reputation and assigned priority.

It is noted that there may be a single crawling policy or several crawling sub-policies created, updated and used according to one or more criteria, such as one policy for each crawling server (if more than one crawling server is used), or web site, or cluster or websites, or news theme, or cluster of news themes, etc. Additional criteria may apply for crawling policies as it becomes apparent from this description to any reader of ordinary skill in related art.

One innovative aspect of the present crawling solution is that the solution uses Web Site Reputation in the creation of crawling policies and the subsequent crawling policy updating and crawling task prioritization as opposed to frequency of appearance used in crawling techniques reported in prior art. Reputation is a safer and more robust metric as it allows to get rid of the influence of sites etc. which produce fake, low quality, questionable news articles, which are either not reproduced or have a quickly declining interest. Unfortunately, with the widespread use of the Internet, thousands of sites report news that are known to them to be fake, or that have not been checked according to well established journalism practices (e.g., never report a story unless it has been verified from at least three different sources or unless tangible evidence is available). In such cases it regularly proves after some time that these (fake) news are of no value, nevertheless they may seriously damage personal, corporate or government reputation, deflect advertising spending to sources with seemingly large visibility and deprive those sites that deserve this money from getting it. Thus, the reputation measure proves valuable in selecting and prioritizing news sources while removing bias from "bad" sources. Another advantage is the ability to evaluate the performance of crawling policies at real time and react immediately when a policy fails. For example, when a news site changes its layout or template, it is highly probably that the crawling mechanism will fail. This failure is automatically detected and a self-healing mechanism is activated. The mechanism reruns the process of policy extraction and adapts to the new site template.

Figure 7:
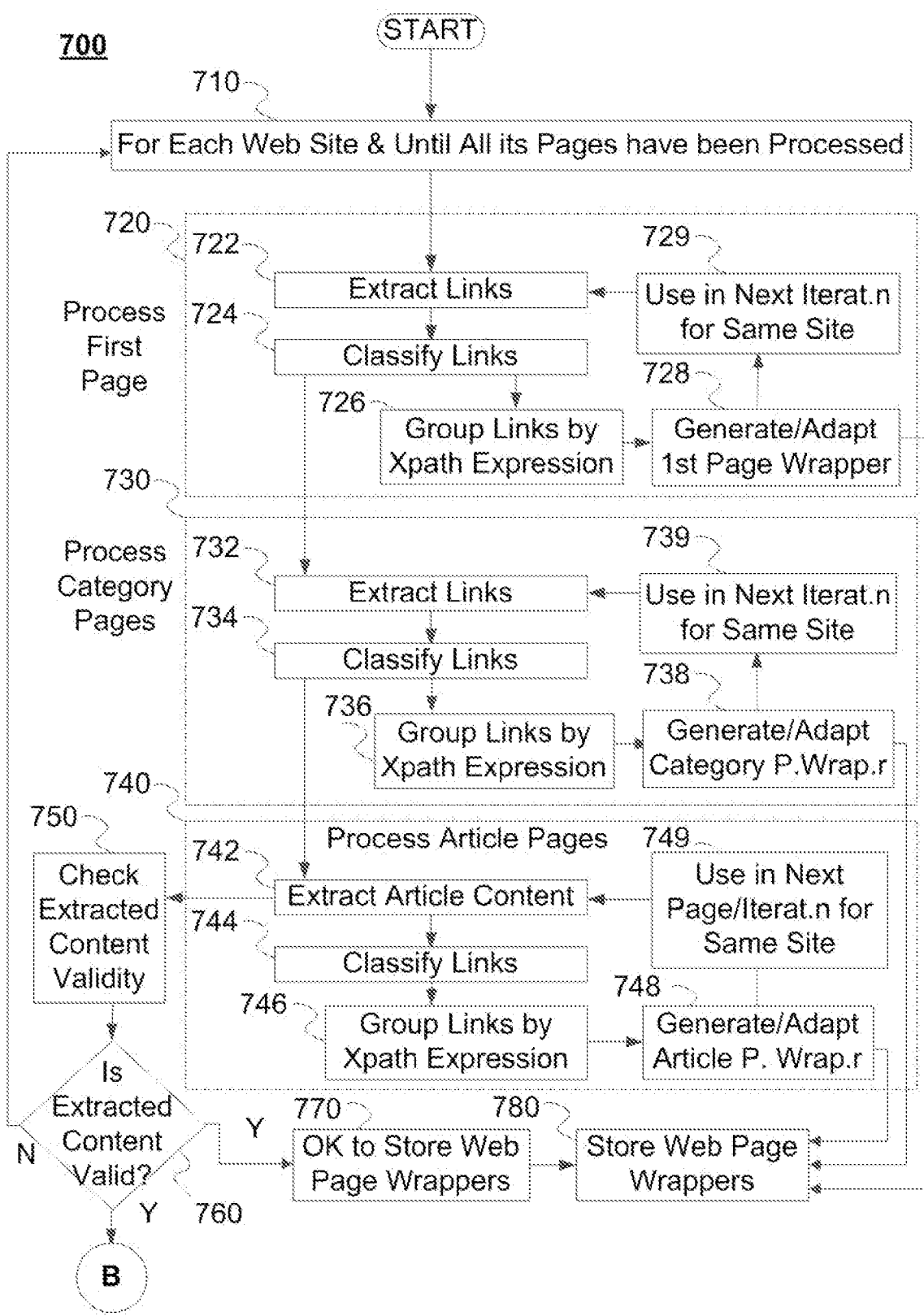
FIG. 7 is a flow diagram showing how web page wrappers used in web site and web page content crawling are created and updated.

FIG. 7 is a flow diagram showing how web page wrappers used in web site and web page content crawling are created and updated. Process 700 starts by processing all web pages in all web sites 710 that are listed in or allowed by the updated crawling policy (or sub-policies). Processing starts with the first page 720 of the first web site, and continues with the category pages 730 of the first web site, and all the article web pages 740 of the first web site and repeats until all web sites have been processed.

To process the first web page 720 of the first web site, all the hyperlinks which are extracted 722 from the first page by the crawling server, are classified into one of three categories 724 (i.e. external links that point outside the web site, links that point to category pages, links that point to non-category pages within the web site, e.g. navigation pages, articles, etc.), links to category pages are grouped by their position in the web page (using common ancestor <div> or other similar HTML nodes) and an XML Path Language (Xpath) expression 726 is generated that identifies page regions with links to category pages.

XPath is a query language for selecting nodes from an XML document, defined by the World Wide Web Consortium (W3C), which in the present discussion relates to the structure and content of a web site/page. In addition, XPath may be used to compute values (e.g., strings, numbers, or Boolean values) from the content of an XML document. XPath was defined by the World Wide Web Consortium (W3C). The XPath language is based on a tree representation of the XML document, and provides the ability to navigate around the tree, selecting nodes by a variety of criteria.

Using the Xpath Expression a First Page Wrapper is created 728 (or updated if one already exists, so as to adapt it to changes in the style and content of the first web page). The new or adapted first page web wrapper is then used in the next iteration of the process for the same web site 729 and in particular in step 722 where the links in the first web page are extracted. More than one web page wrapper may be created and/or updated.

Link extraction 722 can be done with any known algorithm. Be means of example a text parser may be used to identify links and words and select the useful links by checking for file endings (e.g. .html, .jpg, etc.), or in another exemplary embodiment, syntax analysis (e.g. <a> tags in HTML), NLP, NLA, Natural Language Understanding (NLU), or other known techniques (e.g. regular expressions, i.e. a sequence of characters that define a search pattern like in the regular expression "a." where "a" is a literal character which matches just 'a', while '.' is a meta character that matches every character except a newline) may be used.

Figure 14:
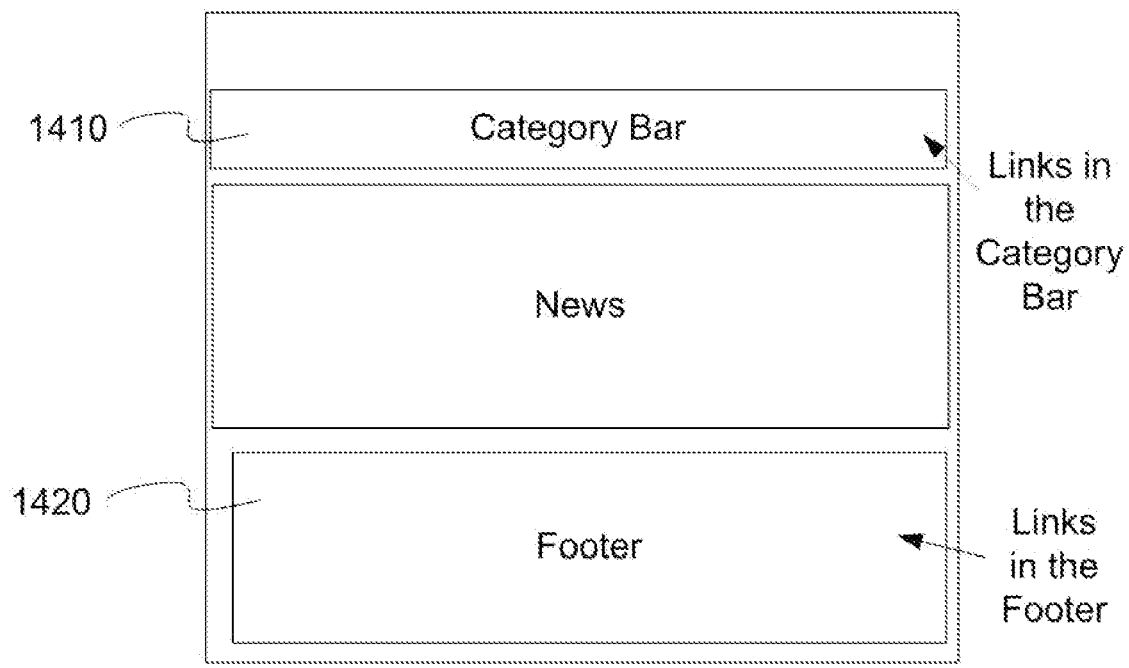
FIG. 14 shows an example of processing a first web page in steps 720.

FIG. 14 shows an example of processing a first web page in steps 720. First web page 1400 is processed using links in the category bar 1410 and links in the footer 1420.

One level down the site structure, to process the category page 730 of the first web site, links are extracted 732 from the category page by the crawling server, are classified 734, and grouped by Xpath expression 736. The links this time are classified into one of three categories (i.e., external links to other sites, links to article pages and links to non-article pages within the site) and similarly page areas that contain links to article pages are located, after processing many category pages from the same website.

Link extraction 732 can be done with any known algorithm. Be means of example a text parser may be used to identify links and words and select the useful links by checking for file endings (e.g. .html, .jpg, etc.), or in another exemplary embodiment, syntax analysis (<a> tags in HTML), NLP, NLA, NLU, or other known techniques (e.g., regular expressions) may be used.

Using the Xpath Expression a Category Page Wrapper is created 738 (or updated if one already exists, so as to adapt it to changes in the style and content of the category web page). The new or adapted category page web wrapper is then used in the next iteration of the process for the same web site 739 and in particular in step 732 where the links in the category web page are extracted.

Figure 15:
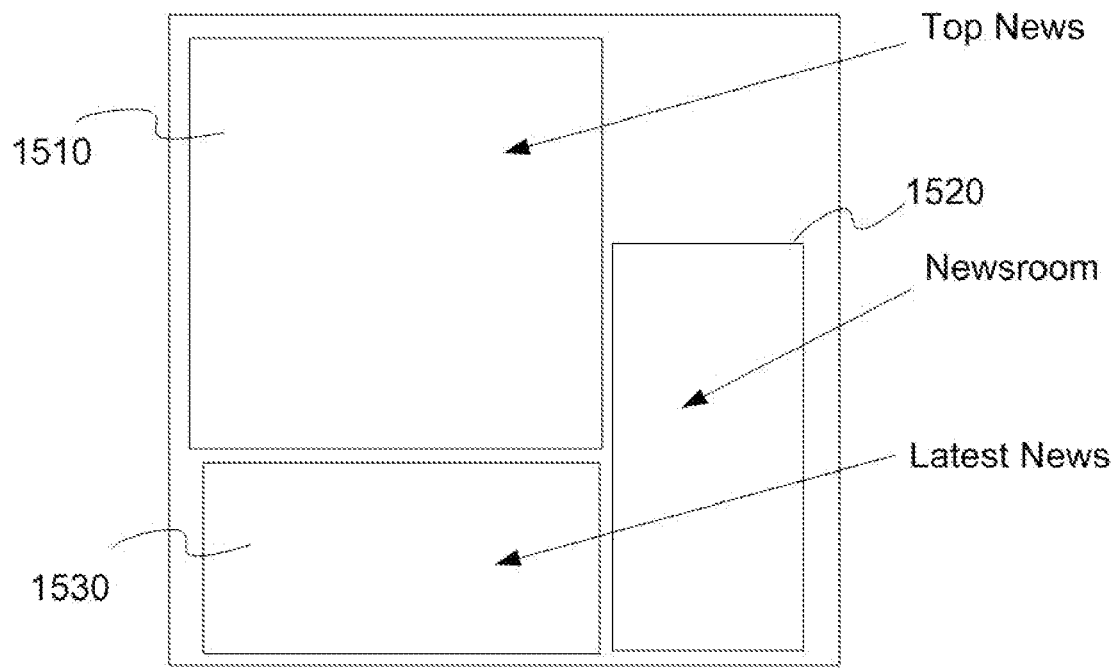
FIG. 15 shows an example of processing a category page in steps 730.

FIG. 15 shows an example of processing a category page in steps 730. Category page 1500 is processed using top news content 1510, newsroom content 1520 and latest news content 1530.

Another level down the site structure, to process an article page 740 of the first web site, article content is extracted 742 from the article page by the crawling server, is classified 744, and grouped by Xpath expression 746. This last step comprises a combination of machine learning techniques (i.e., classification) to locate the elements of interest in an article page (e.g., <div> elements that contain author, article title, article text etc information) and information extraction and NLP techniques to extract the exact content of interest, whilst avoiding noise (e.g., in text ads, etc).

Article content extraction 742 can be done with any known algorithm. Be means of example a text parser may be used to identify large chunks of text (i.e., text body as opposed to titles, etc.) and select the useful article text while ignoring other content in the web page (e.g. image captions, titles, advertisement which typically contain very short text message or no text at all). In another exemplary embodiment, syntax analysis, natural language processing, analysis and understanding, or other known techniques may be used.

Using the Xpath Expression an Article Page Wrapper is created 748 (or updated if one already exists, so as to adapt it to changes in the style and content of the article web page). The new or adapted article page web wrapper is then used in the next iteration of the process for the same web site 749 and in particular in step 742 where the links in the category web page are extracted.

Step 740 is repeated for all article web pages in the web site and each extracted article content 742 is checked for validity 750. The check may be conducted in a variety of means, manually or automatically. Manual check may be done initially so as to train the crawling server and then to switch to supervised or fully automatic operation. Automatic operation may be done using any suitable algorithm, with Neural Networks, Machine Learning, and statistical techniques known in prior art being the prime candidates. Other techniques known in art may also be used. The aim of step 750 is to verify that no useless text is captured (e.g., image captions, titles, advertisement which typically contain very short text message or no text at all and identified as article content.

If the extracted article content is valid 760, the content is retained (stored at a database or other storage structure) and the decision is taken 770 to store 780 the web page wrappers for the first, category, and article pages from steps 728, 738, 748, respectively.

If the extracted article content is not valid 760, process 700 repeats for re-extracting the article content and for updating the 3-page wrappers (produced in steps 728, 738, 748) until a positive decision is taken in step 770.

Figure 16:
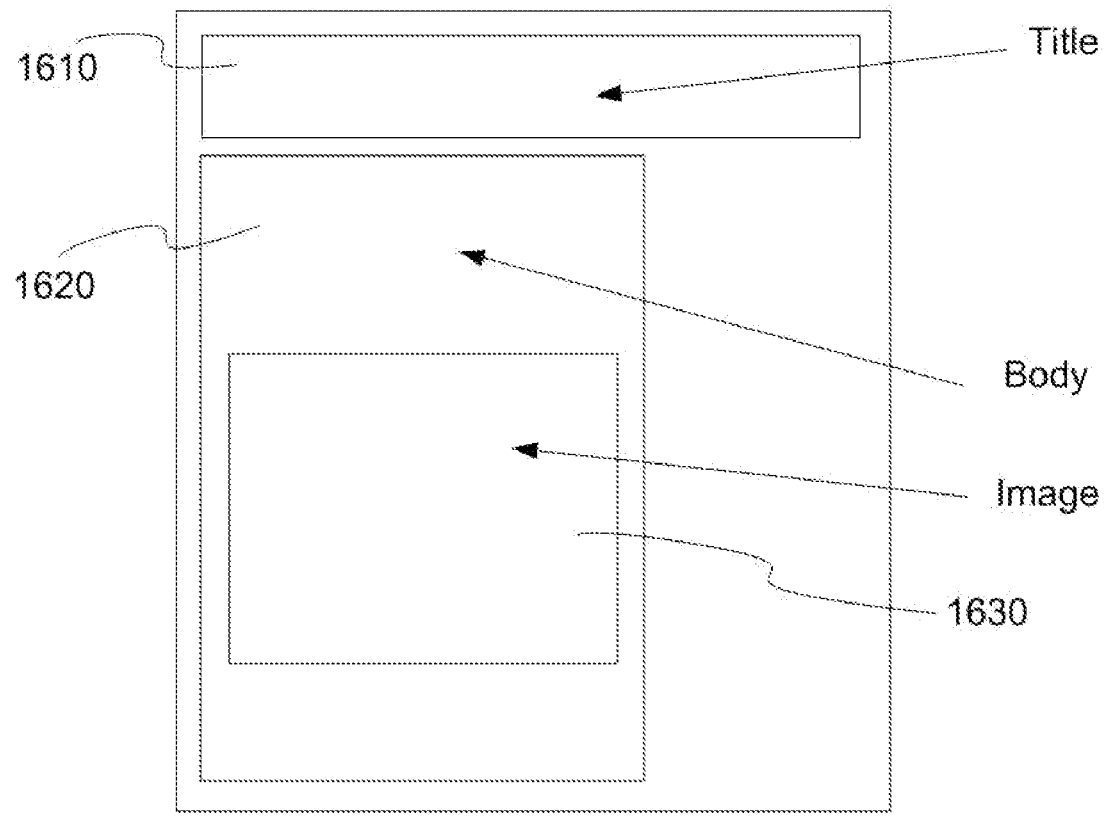
FIG. 16 shows an example of processing an article page in steps 740.

FIG. 16 shows an example of processing an article page in steps 740. Article page 1600 is processed using title 1610, body 1620 and image 1630.

Figure 8:
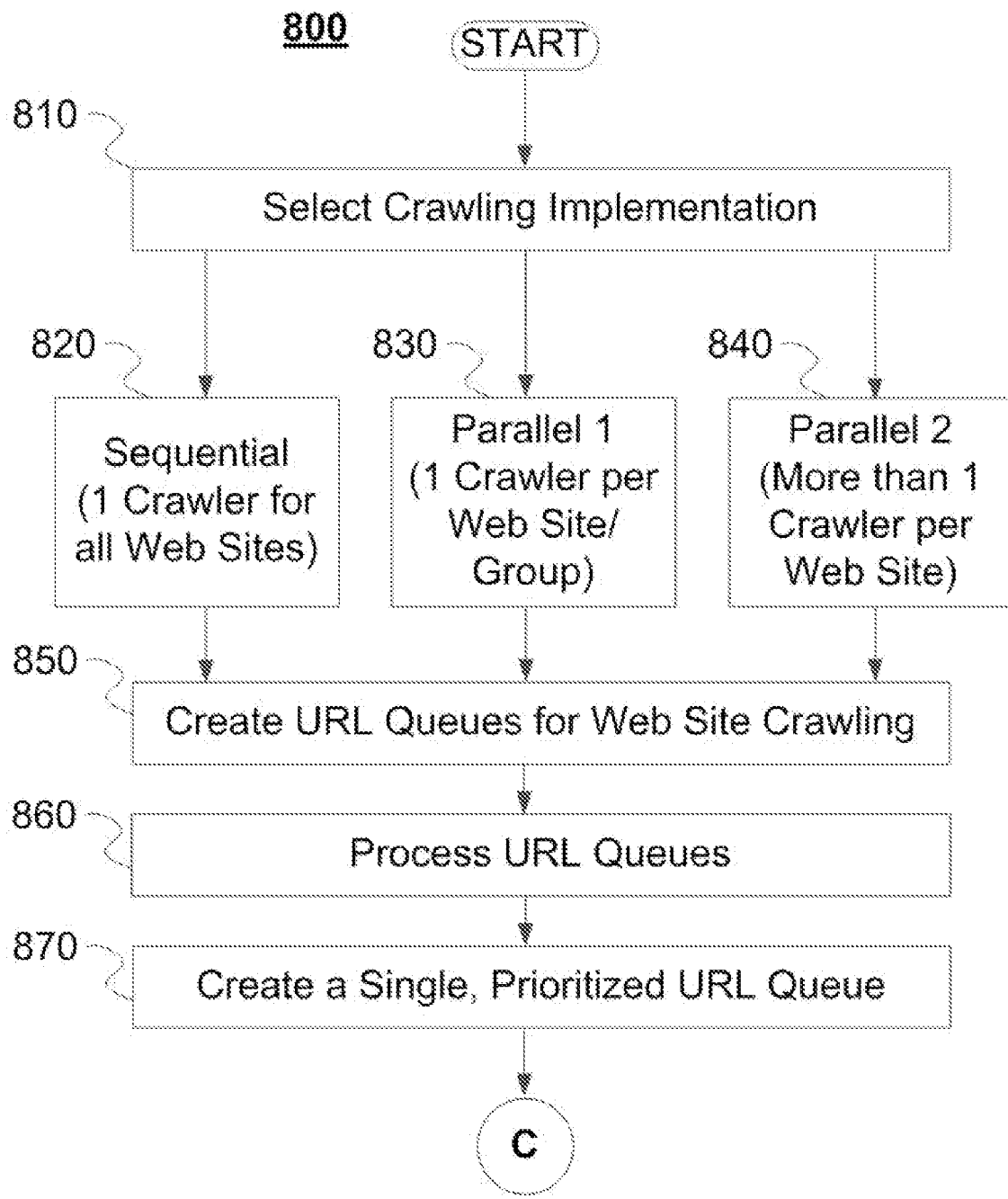
FIG. 8 is a flow diagram showing how web sites are crawled.

FIG. 8 is a flow diagram showing how web sites are crawled. Process 800 starts by selecting a crawling implementation 810 among sequential crawling 820 (where a single crawling server is used to crawl all web sites), parallel crawling 1 830 (where a single crawling server per web site or groups of web sites is used), and parallel crawling 2 840 (where more than one crawler per web site is used).

Having selected the crawling implementation, the crawling server (or the master crawling server when multiple crawling servers are used) creates Universal Resource Locator (URL) queues for web site crawling 850. More than one queue is preferably used per web crawling server to facilitate the implementation of the various steps of process 500. These queues are presented in FIG. 13 and are processed 860 to create a single prioritized URL queue 870 that is used in web site crawling. If parallel 1 or parallel 2 crawling implementations have been selected, one prioritized queue is created in step 870 per crawling server.

The queues are implemented in software, hardware or a combination of the two, and contain ordered lists of URLs.

Figure 9:
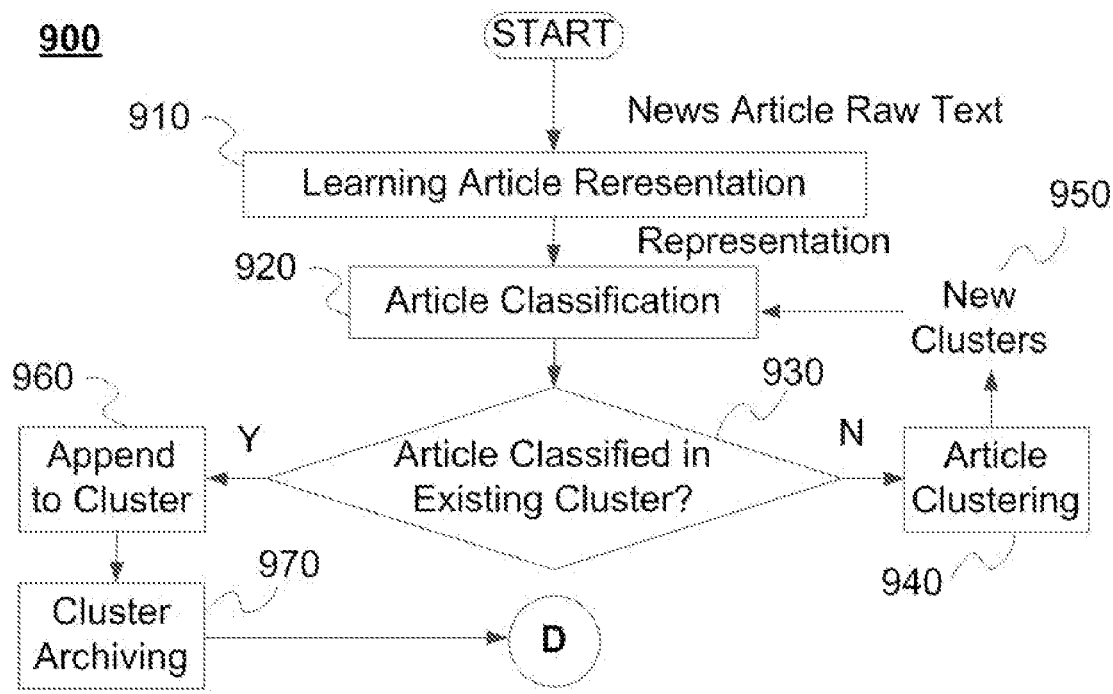
FIG. 9 is a flow diagram showing the steps for clustering news pages and articles.

FIG. 9 is a flow diagram showing the steps for clustering news pages and articles. Process 900 starts by representing the extracted text of each newly fetched (raw text) article using an intermediate representation model, such as Bag-of-Words (BoW) (i.e. a simplified representation used in NLP) and Vector Space Model, or any other Word embedding method for text representation 910. In one aspect this intermediate representation is a high-level representation.

Once the article raw text is mapped to the intermediate representation, it is forwarder to the article classifier 920, which decides whether the article is classified (i.e. grouped together) with the articles of an existing cluster or not 930. Any text classification method can be applied in this step (e.g., Naive Bayes, Support Vector Machine (SVM), single or multi-layer Convolutional Neural Networks (CNN) or Recurrent Neural Networks (RNN)).

The articles that are not classified to an existing cluster are forwarded to the Article Clustering process 940, which uses a text similarity method and a clustering algorithm to form new clusters 950. The articles that are similar to an existing cluster, are appended to the cluster and the cluster is updated accordingly 960. The last update date is kept with the cluster.

A cluster that has not been updated for a long period is archived 970.

Figure 17:
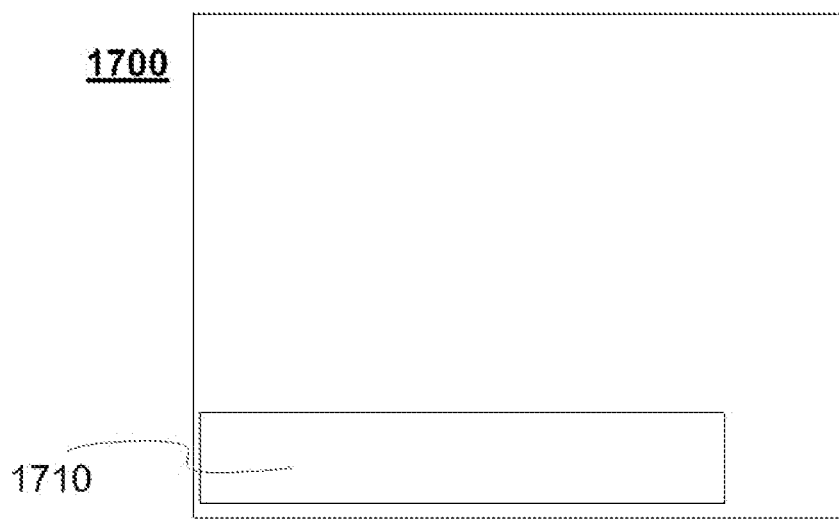
FIG. 17 shows an example cluster of similar articles.

FIG. 17 shows an example cluster of similar articles. The example cluster 1700 contains a collection of similar articles 1710, containing 104 news articles, 9 blog articles, 1 opinion article, 88 multimedia articles, and comments.

Figure 10:
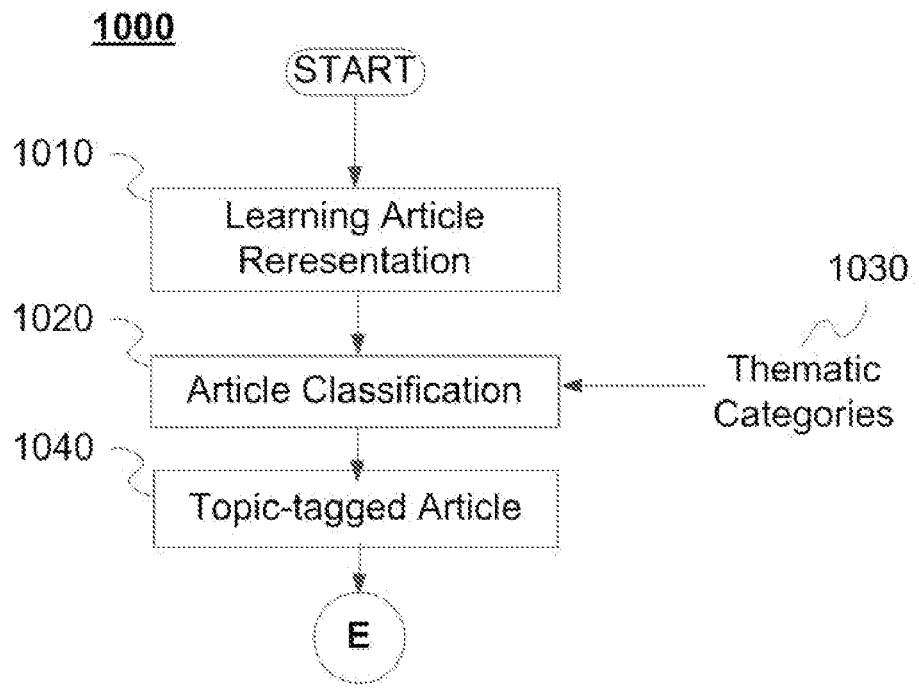
FIG. 10 is a flow diagram showing the steps for analyzing news pages and articles.

FIG. 10 is a flow diagram showing the steps for analyzing news pages and articles. Process 1000 starts with a representation of the article text and metadata (author, URL, multimedia etc.) and the metadata of the article's source web site (domain name URL, web site type, thematic orientation, etc). Deep and wide learning models are employed to represent both textual information and metadata 1010. Any classification technique (e.g. Naive Bayes, SVMs, single or multi-layer CNNs or RNNs) 1020 can be applied to assign an article to one or more pre-defined categories (tags) 1030 and attach this information to the article 1040.

Figure 11:
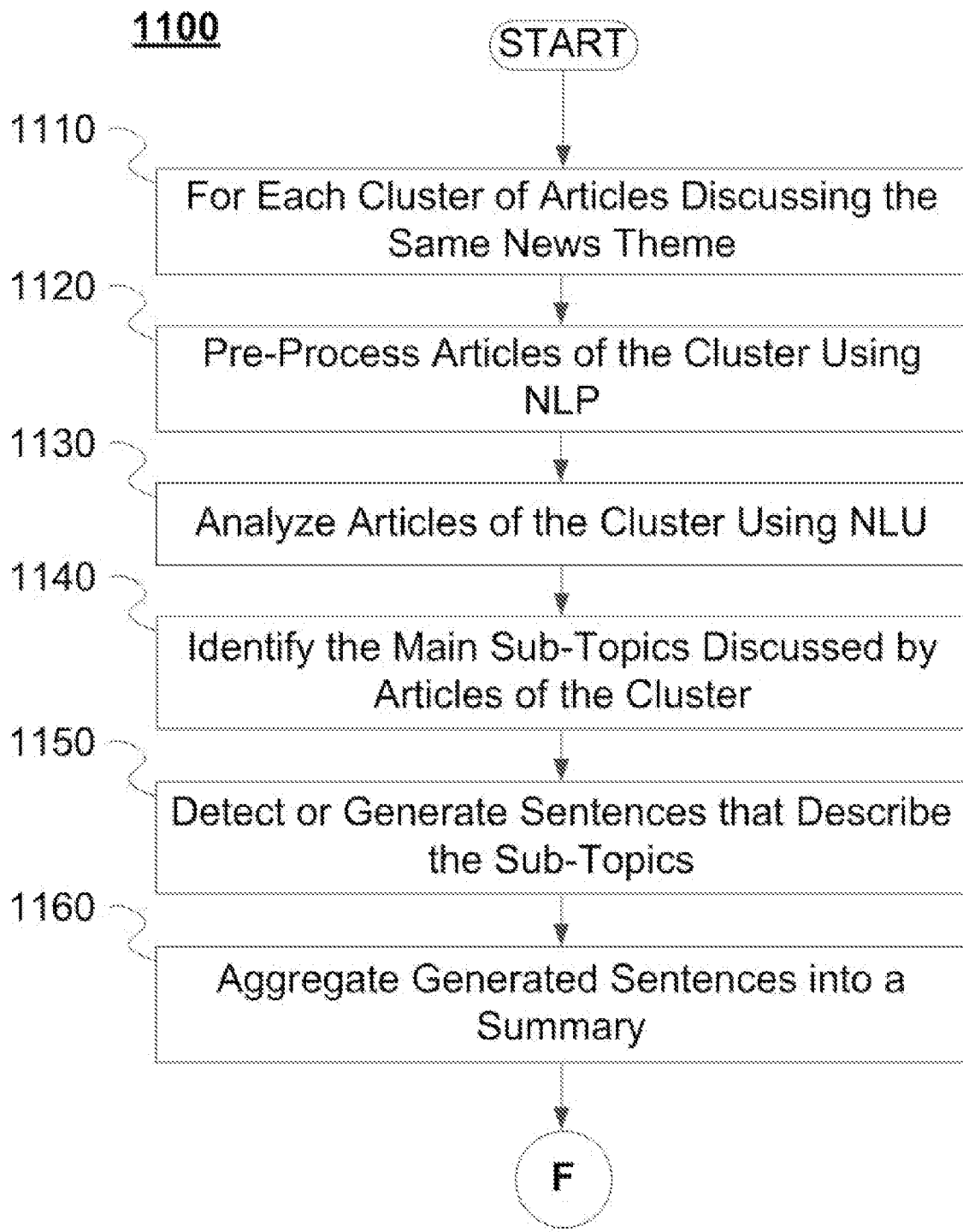
FIG. 11 is a flow diagram showing how a news theme summary is created by aggregating sub-topic text.

FIG. 11 is a flow diagram showing how a news theme summary is created by aggregating sub-topic text. Process 1100 starts by selecting all crawled articles that have been clustered together because they discuss the same news theme 1110 and pre-processing these articles using NLP techniques 1120. Pre-processed articles are then analyzed using NLU techniques 1130 and the main sub-topics discussed by the selected web articles of each cluster are identified 1140.

Having analyzed the web articles in each cluster, sentences describing the identified sub-topics are detected in the analyzed web articles or are generated 1150 by mixing and matching sentence fragments using the NLU results.

Process 1100 ends by aggregating the detected or generated sentences from step 1150 into a summary of the news articles for each cluster of articles 1160.

Figure 18:
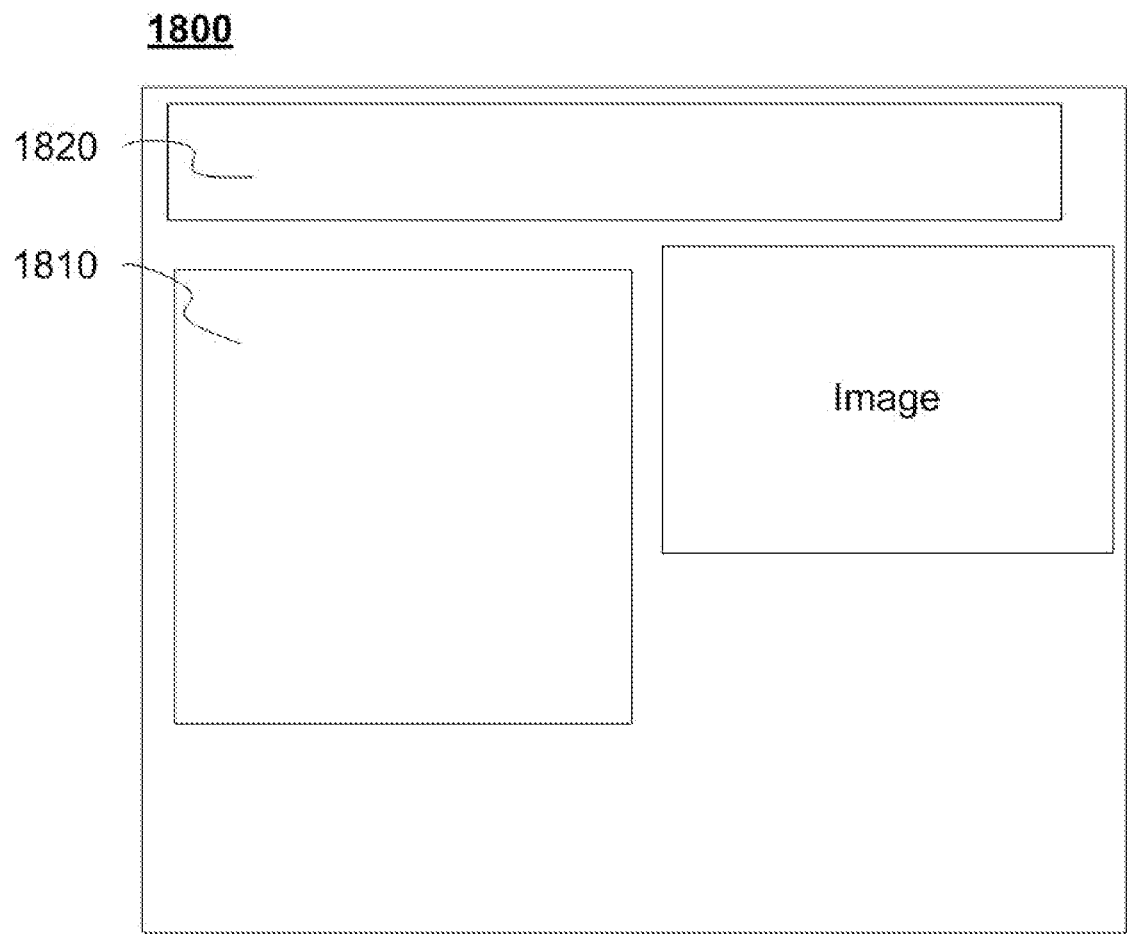
FIG. 18 shows an example news theme summary page.

FIG. 18 shows an example news theme summary page. News theme summary page 1800 contains news summaries 1810 related to a news theme 1820.

Figure 12:
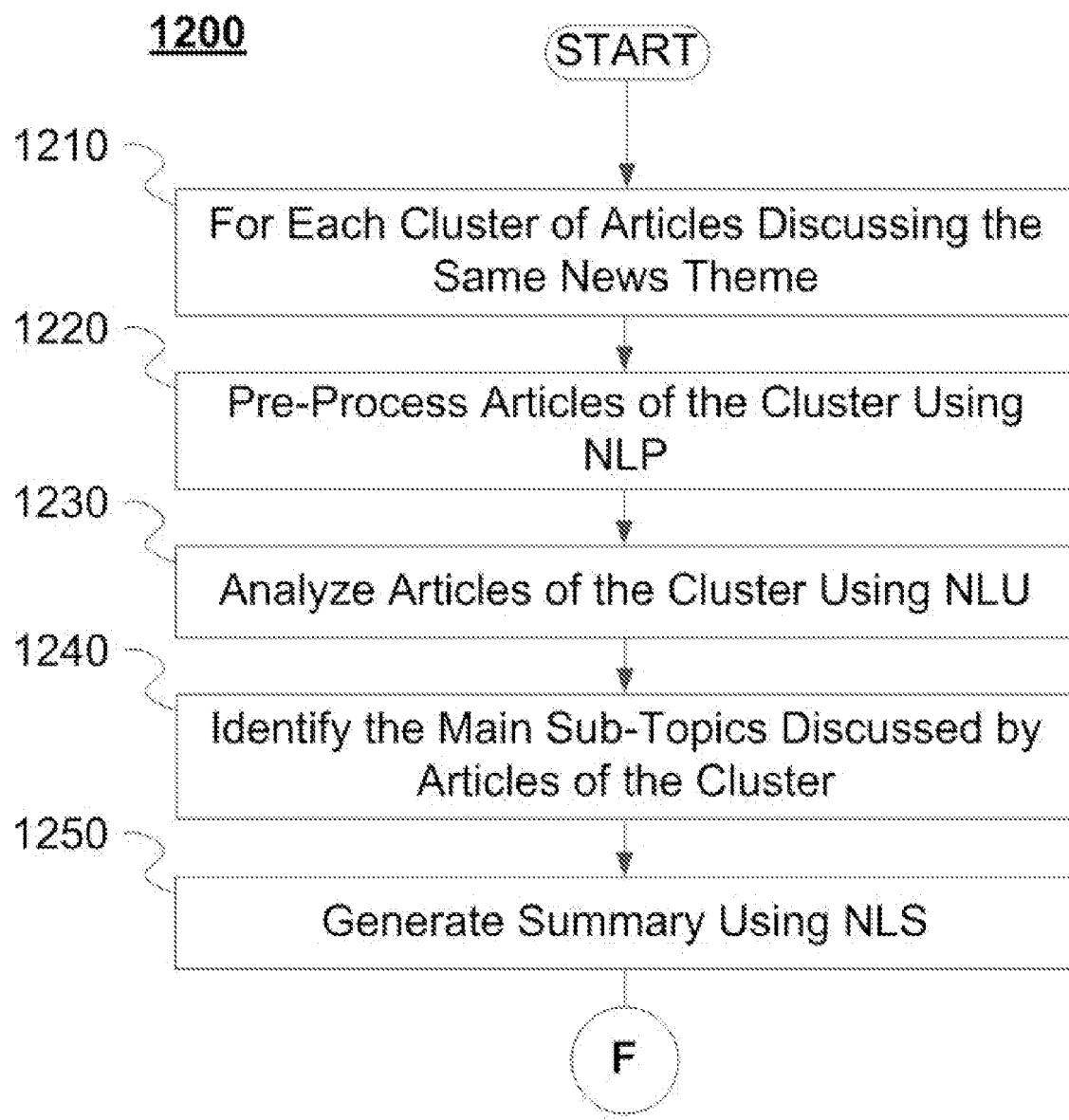
FIG. 12 is a flow diagram showing how a news theme summary is created with Natural Language Synthesis techniques.

FIG. 12 is a flow diagram showing how a topic summary is created with Natural Language Synthesis (NLS) techniques. Process 1200 starts by selecting all clustered crawled articles that discuss the same news item 1210 and pre-processing them using NLP techniques 1220. Pre-processed articles are then analyzed using NLU techniques 1230 and the main sub-topics discussed by the selected web articles of each cluster are identified 1240.

Process 1200 ends by generating a summary of the news articles for each cluster of articles using NLS techniques 1250 on the results of step 1240.

Figure 13:
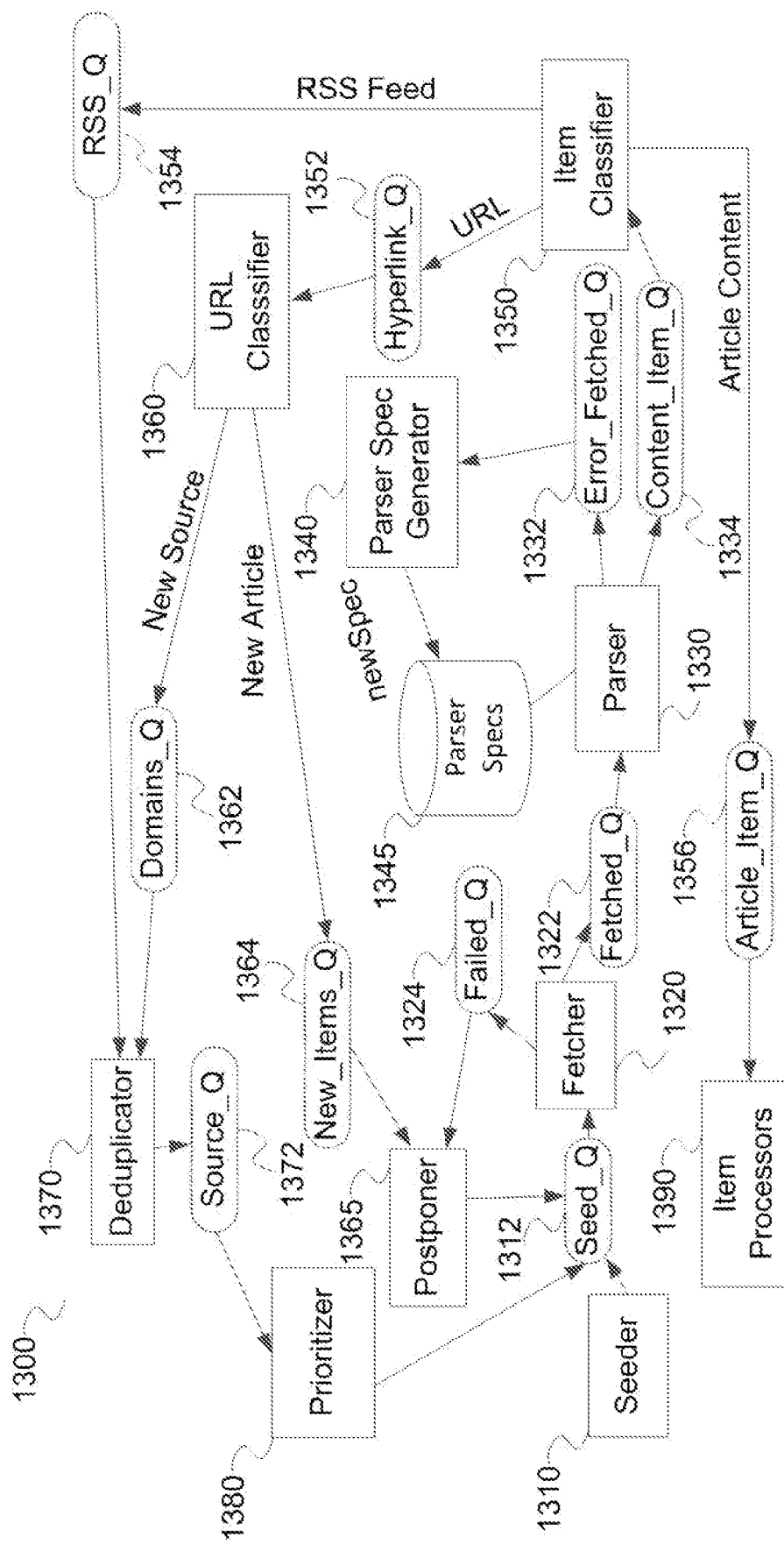
FIG. 13 is a block diagram of the main logical modules and queues of system 100.

FIG. 13 is a block diagram of the main logical sub-modules and queues of system 100. In system 1300, processor module 250 of Crawling server 160 (and optionally all processing modules of additional crawling servers used in alternative exemplary embodiments) should be regarded as a purpose-built unit (or units in alternative exemplary embodiments) specifically adapted to implement the present innovative crawling solution. Viewed from a hardware perspective, processing module 250 may be divided into several logical sub-modules each implementing a specific task (e.g. parse, prioritize, classify, etc.) as shown in FIG. 2B. These sub-modules may be real (i.e. in hardware), virtual (i.e. in software), or hybrid (i.e. a mixture of hardware and software) and be implemented in a single computing apparatus or in more than one computing apparatuses. Real sub-modules are manufactured as ASICs or other technologies while virtual sub-modules are simply using existing processor real estate to run specialized or embedded software that ultimately transforms the virtual sub-modules by emulating the behavior of purpose-build hardware sub-modules. From the hardware perspective, hardware sub-modules are associated (connected to) at least one hardware (or software, or a combination thereof) queue. Hardware queues are implemented either in dedicated queue sub-modules at processor module 250 or at memory module 240, either in the same computing apparatus or in more than one computing apparatuses.

Viewed from a software perspective, software or embedded software running at processor module 250 creates virtual sub-modules and queues and performs the same operation as described above for the hardware. This software approach may lack slightly in speed but is more versatile as it allows for easy reconfiguration according to new performance needs and other considerations of system 100. In alternative exemplary embodiments, a combination of hardware and software sub-modules for processing and for crawling queues is used to achieve higher processing speed and easier reconfiguration.

A seeder sub-module 1310 generates a list of URL sources (i.e., URLs of the web sites and web pages) to be fetched during crawling. The list of URL sources is entered into Seed Queue 1312 and the queue is read by fetcher sub-module 1320, which fetches the content of each source URL. The fetched content is entered into fetched_queue 1322 and the queue is read by parser sub-module 1330, which processes the fetched content and extracts content items (or elements) (e.g., title, content, author, media, etc.) using parser specifications read from database 1345 (or other data structure). The extracted content items are stored in content_item_queue 1334 and the queue is read by item classifier sub-module 1350, which processes the fetched content items and stores them in either article_item-queue 1356 if the item is a news article, or in hyperlink_queue 1352 if the item is a hyperlink, or in RSS_queue 1354 if the item is a Rich Site Summary (RSS) feed.

Article content stored in the article_item_queue 1356 is read by item processor module 1390 (additional processing modules 1390 are used in alternative exemplary embodiments), which performs at least one of Named Entity Recognition (NER), sentiment analysis, language detection, aspect mining, clustering, summarization, etc. and produces the output of the present innovative crawling solution.

Hyperlinks stored in hyperlink_queue 1352 are read by URL classifier sub-module 1360, which classifies URLs into one of three classes: a URL leading to a new source domain with relevant content, a URL leading to an irrelevant source, or a URL leading to a new resource (i.e., article) to be fetched.

URLs leading to irrelevant sources are ignored or in alternative exemplary embodiments are entered into an irrelevant queue for elimination from other queues.

URLs leading to new source domains are entered into domain_queue 1362 and domain_queue 1362 is read together with RSS_queue 1354 by deduplicator sub-module 1370. Deduplicator sub-module 1370 examines if the source is already in the list of known sources, and if not it enters the source in sources_queue 1372, which is read by prioritizer sub-module 1380, otherwise the source is ignored as it already exists in seed_queue 1312. Prioritizer sub-module 1380 reads sources_queue 1372 and gives high priority to URLs from selected domains or RSS feeds so that they are fetched more frequently, and its output is stored in seed_queue 1312, effectively creating a closed loop where all sub-queues converge into a single queue, i.e., seed_queue 1312. Prioritization takes into account the number of posts from a source that have been mentioned by other sources more than a threshold number of times in the recent past. In an alternative, multiple priority queues are used per data source, each priority queue for a different thematic topic, in order to assign different priorities by topic to the same source. A single queue is fed by the multiple queues and merges their input using information about the popularity of a thematic topic in the recent past (e.g., the number of articles published per topic).

The frequency of fetching of URLs imposed by prioritizer sub-module 1380 to the fetcher module 1320 via the seed_Q 1312 is a very important innovation of the present innovative crawling solution and exploits the fact that an article may be from an important (e.g., prestigious or fast updating or other) source. Additionally, the frequency of fetching is important because it may be used to take into account additional sources, like user comments to news articles, amateur journalism where news coverage is built from individual user comments/tweets/articles/etc., and social media posts and comments, blog posts and comments, etc.

During the process described in FIG. 13, fetcher sub-module 1320 may fail to fetch contents of a source URL for a number of reasons, such as network problem, routing/Domain Name Server (DNS) etc. server problems, web server problems, source web site problems, etc. To cater for such problems, fetcher sub-module 1320 stores failed URLs into failed_queue 1324 and the failed_queue 1324 is read (together with new_item_queue 1364 storing new articles detected by URL_classifier sub-module 1360) by postponer sub-module 1365, which module 1365 stores the URLs it reads into seed_queue 1312.

Parser sub-module 1330 may fail to process fetched content and extract content items. In such a situation, parser sub-module 1330 stores the failed content into error_fetched_queue 1332 and the queue is read by parser specification generator 1340, which processes groups of fetched content items from the same source/domain and generates specifications (i.e., Xpath expressions) for parser sub-module 1330. The new specifications are stored in parser specifications database 1345 (or other data structure) and are read (either periodically or when an interrupt is created by the parser specification generator 1340) by parser sub-module 1330.

As a result of the above pool of queues, seed_queue 1312 contains an ordered list or URLs to crawl, where priority is given to those URLs that are more important, from sources with higher reputation, change more frequently, and are new as derived from associated metadata and thresholds. In addition, hot topics that temporarily receive a lot of article publications, will be temporarily promoted and the respective priority lists, will be merged to the final list with higher priority.

The logic behind FIG. 13 is adequate to cater for errors in the crawling process and support the change of states in the process, while catering for prioritization, and aspects of the sources of web articles such as reputation, update frequency, layout of the web sites and web pages, etc. Various modification of order, name, and number of the sub-modules and queues are possible without deviating from the scope of the present innovative crawling solution. One may, for instance add new queues or sub-modules (parallel and/or serial) for handling differently content from different types of sources (e.g., social media) or for exemplary embodiments using parallel processing in the form of multiple crawling servers, crawling server farms, cloud-based crawling servers, multiple processor cores per processor or multiple processors per crawling server, etc. Alternatively, one may merge some of the queues of system 1300.

In addition to these modifications, further modifications may be introduced for synergetic computing where the processing resources used and/or crawling results produced for a particular application, user, or client are shared or partially shared for other applications, users, or clients. In such cases, at least the parser specifications and article_item_queues are further processed according to specifications relating to data privacy, crawling preferences privacy etc., so as to safeguard personal data according to current legislation (e.g. State Data Protection Legislation in the US, Data Protection Act in the UK, General Data Protection Regulation (GDPR) in the EU, etc.).

The processes presented above refer to news sites and news articles and are given by example. It is noted that the scope of the present innovative crawling solution is not limited to news related sites and article but applies to crawling of all sources of on-line content and includes other form that text, namely images, video, multichannel audio, vlogs, etc. Where non-textual content is used the proposed crawling method may use metadata accompanying the non-textual content, or in other exemplary embodiments apply additional processing steps where textual data is derived from the non-textual content. By means of example, voice speech and sound recognition may be used to create text versions of speech or text description of sound (e.g., song title, metadata describing an explosion, etc.), or image/video/3D analysis may be used to create metadata describing visual content. Techniques for audio-visual content processing are well known in prior art and are not included in the present disclosure as they are obvious to any reader of ordinary skill in related art.

Raw, processed and analyzed data are stored in queues and databases (such as SQL, noSQL or other) while in alternative exemplary embodiments are stored in log files, data structures, etc. Data are stored in ASCII, XML files, compressed, encrypted, or other representations and file formats.

The above exemplary embodiment descriptions are simplified and do not include hardware and software elements that are used in the embodiments but are not part of the current innovative solution, are not needed for the understanding of the embodiments, and are obvious to any user of ordinary skill in related art. Furthermore, variations of the described technique, system architecture, and software architecture are possible, where, for instance, technique steps, and hardware and software elements may be rearranged, omitted, or new added.

Various embodiments of the invention are described above in the Detailed Description. While these descriptions directly describe the above embodiments, it is understood that those skilled in the art may conceive modifications and/or variations (such as addition, deletion, or reordering of process steps, and software and hardware modules) to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

Those of skill in the art would understand that signals may be represented using any of a variety of different techniques. For example, data, software, instructions, signals that may be referenced throughout the above description may be represented by voltages, currents, electromagnetic waves, magnetic fields or particles, light or any combination thereof.

Those of skill would further appreciate that the various illustrative radio frequency or analog circuit blocks described in connection with the disclosure herein may be implemented in a variety of different circuit topologies, on one or more integrated circuits, separate from or in combination with logic circuits and systems while performing the same functions described in the present disclosure.

Those of skill would also further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or any other device or apparatus operating as a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for web page crawling and summarization, the system comprising:
- at least one crawling server, wherein the at least one crawling server has at least one processor;
- at least one database connected to the at least one crawling server, wherein the at least one database is configured for storing at least one of (a) at least one crawling policy and (b) crawling results; and
- a parser specification database connected to the at least one crawling server;

wherein the at least one processor comprises:
- a seeder sub-module configured for generating a list of Universal Resource Locators (URL) of web sites and web pages for fetching during the web page crawling;
- a seed queue configured for storing the list of URLs;
- a fetcher sub-module configured for fetching content of each URL in the list of URLs in the seed_queue and for storing the content of each URL in a fetched_queue;
- a parser sub-module configured for processing the content of each URL from the fetched_queue and for extracting content items using at least one parser specification read from the parser specification database;
- a content_item_queue configured for storing the extracted content items;
- an item classifier sub-module configured for reading the content_item_queue, processing and storing the fetched content items into one of (c) an article_item-queue if the fetched content item is a news article, (d) a hyperlink_queue if the fetched content item is a hyperlink, and (e) an RSS_queue if the fetched content item is a Rich Site Summary (RSS) feed;
- an item processor module configured for reading content of the article_item_queue, performing at least one of Named Entity Recognition (NER), sentiment analysis, language detection, aspect mining, clustering, and summarization, and producing an output of the system for web page crawling and summarization;
- a URL classifier sub-module configured for reading hyperlinks stored in the hyperlink queue, and classifying URLs into one of (f) a first class comprising URLs leading to a new source domain with relevant content, (g) a second class comprising URLs leading to an irrelevant source, and (h) a third class comprising URLs leading to a new resource to be fetched, and entering (j)URLs of the first class into a domain queue, (k) URLs of the second class into an irrelevant queue, and (l) URLs of the third class into a new items queue;
- a deduplicator sub-module configured for reading URLs from a domain_queue and the RSS_queue, and entering the read URLs in a sources_queue if the read URLs are not already in a list of known sources; and
- a prioritizer sub-module configured for reading the sources_queue and giving a high priority to URLs from one of selected domains and RSS feeds, storing prioritized URLs in the seed_queue, and imposing a frequency of fetching of URLs to the fetcher sub-module.

2. The system of claim 1, wherein
the fetcher sub-module is further configured for storing at a failed_queue failed URLs when the fetcher sub-module fails to fetch contents of a source URL;
the postponer sub-module is further configured for storing at a new_item_queue new articles detected by the URL_classifier sub-module; and
a postponer sub-module is configured for reading URLs from the failed_queue and the new_item_queue, and storing the URLs into the seed_queue.

3. The system of claim 2, wherein
the parser sub-module is configured for storing at an error_fetched_queue failed URLs when the parser sub-module fails to process fetched content and extract content items; and
a parser specification generator is configured for reading the error_fetched_queue, processing groups of fetched content items from a same source, generating specifications for the parser sub-module, and storing new specifications in a parser specifications database, wherein the parser specifications database is configured for being read by the parser sub-module.

4. The system of claim 1, wherein:
the high priority given by the prioritizer sub-module to URLs from one of selected domains and RSS feeds is given to those URLs that are one of more important, from sources with high reputation, change frequently, are new, and temporarily receive a lot of article publications as derived from associated metadata and thresholds; and
the new resource is an article.

5. The system of claim 1, wherein the content items are elements selected from title, content, author, and media.

6. The system of claim 3, wherein the specifications are Xpath expressions.

7. A method for web page crawling and summarization implemented at least by one processor of at least one crawling server, the method comprising:
- retrieving web crawling policies;
- using a web page wrapper submodule for retrieving web page wrappers;
- at a crawling submodule, (a) using the web crawling policies for creating a seed_queue for crawling web pages, and (b) crawling web pages using the priority queue and the web page wrappers;
- using a clustering submodule for clustering crawled web pages and articles into a plurality of clusters using a news theme criterion;
- using a page analyzer submodule for analyzing web pages in each of the plurality of clusters; and
- using a summarizer submodule for summarizing web pages in each of the plurality of clusters to produce a summary for each cluster;
- where the seed queue comprises a prioritized list of Universal Resource Locator (URL) elements for crawling web pages, the seed queue is filled with the processed elements of a new item queue, a sources_queue and a failed queue, and where the new item queue, the sources_queue and the failed queue are filled with the processed content elements of at least one of:
- a fetched queue comprising crawled content from the URL element list of the seed queue;
- a content item queue comprising processed content elements extracted from the crawled content of the fetched queue;
- an article item queue comprising article content elements selected from the content elements in the content item queue;
- a hyperlink queue comprising hyperlink content elements selected from the content elements in the content item queue;
- a Rich Site Summary (RSS) queue comprising RSS feed content elements selected from the content elements in the content item queue;
- an irrelevant queue comprising URL content elements which are removed from other queues;

a domain queue comprising URL content elements leading to new source domains;

a sources_queue comprising URL content elements leading to new source not contained in the RSS_queue;

a failed queue comprising URL elements for which crawling failed; and an error fetched queue comprising crawled content for which parsing of content elements failed.

8. The method of claim 7, where the web pages comprise at least one of news pages, social media pages, blog articles, vlog articles, opinion pages, multimedia articles, comments, and opinion articles.

9. The method of claim 7, where crawling web pages comprises first crawling a first web site first page, then crawling a category page of the same web site, and finally crawling all the web pages of the category page of the web site before crawling a second web site.

10. The method of claim 7, where the web sites are news sites.

11. The method of claim 7, where the web crawling policies and the seed_queue are based on web site influence, reputation and impact.

12. The method of claim 11, where the site reputation is calculated from at least one of the following:

frequency of article news mentioning article publications per web site;

articles publishing rate;

thematic categorization of source domains and source pages;

history of sources reputation;

negative feedback for the site derived from users' negative comments at least at one of the site, site's web pages, web pages external to the site, news pages, social media pages, blog articles, vlog articles, opinion pages, multimedia articles, comments in the web site's web pages, and opinion articles; and regulator's sanctions against a site for bad journalism practices and the like.

13. The method of claim 7, further comprising creating or updating the web crawling policies by the crawling policy submodule and the web page wrappers by the web page wrapper submodule.

14. The method of claim 13, where at least one of the following is true:

different web page wrappers are created or updated by the web page wrapper submodule for (a) the first page, (b) the category pages and (c) the web pages of a first web site, and different web page wrappers are created for pages of a second web site; and a plurality of priority queues is used per data source, where each priority queue is used for assigning a different priority to each topic of the data source.

15. The method of claim 14, where creating or updating a web page wrapper by the web page wrapper submodule comprises:

extracting links from the page of the web site;

classifying links;

grouping links by Xpath expression;

generating or adapting the page wrapper;

using the created or updated page wrapper to extract content from a web page;

checking the validity of the extracted content; and if the extracted content is not valid, updating the page wrapper.

16. The method of claim 7, where the web page crawling is implemented in one of the following modes:

sequential crawling of web sites;

parallel crawling of web sites; and parallel crawling of web pages in the same web site.

17. The method of claim 7, where web pages in each of the plurality of clusters are analyzed by the page analyzer submodule using Natural Language Processing (NLP) and Natural Language Understanding (NLU) to identify subtopics discussed in the web pages.

18. The method of claim 7, where the summary for each cluster is generated by the summarizer submodule by first detecting or generating sentences that describe the subtopics of the web pages in the cluster and then aggregating the detected or generated sentences into the summary.

* * * * *